United States Patent
Huang et al.

(10) Patent No.: US 8,320,049 B2
(45) Date of Patent: Nov. 27, 2012

(54) TUNABLE LIQUID GRADIENT REFRACTIVE INDEX LENS DEVICE

(75) Inventors: Tony Jun Huang, State College, PA (US); Xiaole Mao, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 270 days.

(21) Appl. No.: 12/836,651

(22) Filed: Jul. 15, 2010

(65) Prior Publication Data
US 2011/0013287 A1   Jan. 20, 2011

Related U.S. Application Data

(60) Provisional application No. 61/225,610, filed on Jul. 15, 2009, provisional application No. 61/363,431, filed on Jul. 12, 2010.

(51) Int. Cl.
G02B 3/14 (2006.01)
(52) U.S. Cl. .................................................. 359/666
(58) Field of Classification Search .......... 359/665–667; 362/318
See application file for complete search history.

(56) References Cited

U.S. PATENT DOCUMENTS

| | | | |
|---|---|---|---|
| 6,408,112 B1 * | 6/2002 | Bartels | 385/16 |
| 6,952,504 B2 | 10/2005 | Bi et al. | |
| 2003/0117691 A1 | 6/2003 | Bi et al. | |
| 2005/0264811 A1 | 12/2005 | Bi et al. | |
| 2006/0187402 A1 | 8/2006 | West et al. | |
| 2007/0177276 A1 | 8/2007 | Liogier D'ardhuy et al. | |
| 2007/0201138 A1 | 8/2007 | Lo | |
| 2007/0211207 A1 | 9/2007 | Lo et al. | |
| 2008/0019015 A1 | 1/2008 | Fernandez et al. | |
| 2008/0259463 A1 | 10/2008 | Shepherd | |
| 2009/0128922 A1 | 5/2009 | Justis et al. | |

* cited by examiner

*Primary Examiner* — Joseph P Martinez
(74) *Attorney, Agent, or Firm* — Buchanan Ingersoll & Rooney PC

(57) ABSTRACT

A lens device includes a substrate having a channel and a first fluid flow path and a second fluid flow path. The first and second fluid flow paths at least partially in communication with the channel. A light emitting device is positioned adjacent to the channel. At least one first fluid source is in communication with the first fluid path such that a first fluid is moveable along the first fluid path and at least one second fluid source in communication with the second fluid path such that a second fluid is moveable along the second fluid path. The first second fluid paths are configured so the first fluid and second fluid move through the channel to define an adjustable liquid gradient refractive index distribution in the channel. Adjustment of the liquid gradient refractive index distribution permits a change of liquid lens focal distance or an angular adjustment of light emitted by the light emitting device.

23 Claims, 18 Drawing Sheets

TUNABLE LIQUID GRADIENT REFRACTIVE INDEX LENS DEVICE

CROSS-REFERENCE TO RELATED APPLICATION

The present application claims priority under 35 U.S.C. §119(e) to U.S. Provisional Patent Application Ser. No. 61/225,610 which was filed on Jul. 15, 2009 and U.S. Provisional Patent Application Ser. No. 61/363,431, which was filed on Jul. 12, 2010. The entirety of U.S. Provisional Patent Application Ser. Nos. 61/225,610 and 61/363,431 are incorporated herein by reference.

STATEMENT REGARDING FEDERALLY SPONSORED RESEARCH

The present patent application relates to a tunable optofluidic lens device that was developed as part of a grant provided by The National Science Foundation. The U.S. Government has a paid-up license in this invention and the right in limited circumstances to require the patent owner to license others on reasonable terms as provided for by the terms of Grant Nos. ECCS-0609128, ECCS-0824183 and ECCS-0801922, which were awarded by The National Science Foundation. See 35 U.S.C. §202.

FIELD OF INVENTION

The present invention relates to lens devices such as lenses and, more particularly, to tunable optofluidic lens devices.

BACKGROUND OF THE INVENTION

In liquid-liquid optofluidic devices, light can be manipulated purely by liquid flow, thus eliminating the need for mechanical or electrical light-manipulating mechanisms. Various tunable optofluidic microlenses based on liquid-liquid interfaces have been successfully demonstrated. The key to these liquid-liquid interface-based microlenses is to create a hydrodynamically tunable, curved liquid-liquid interface between two side-by-side flowing fluids having different refractive indices. The tunable liquid-liquid interface can then act as a refractive lens to variably focus light.

We developed a lens that is sized and configured as a microlens, as shown in FIG. 1. The microlens is configured to operate such that the lens has an optically smooth, curved fluidic interface. A refractive contrast between fluids is used to focus light emitted from a light source, such as an optical fiber. For instance, two fluids with different refractive indices may be used, such as a calcium chloride ($CaCl_2$) solution and distilled water. The two fluids can be coinjected into a microfluidic device that has a 90 degree curve. The fluids may flow along the curved channel in a laminar flow to provide an optically smooth, nearly planar or substantially planar interface between the co-injected fluids. Upon entering the curved portion of the channel, the fluids are perturbed by a Dean flow effect due to a centrifugal force induced within the curved portion of the channel, which causes the originally flat fluidic interface to bow outwardly and form a cylindrical microlens. The curvature of the fluidic interface and, therefore, the focus point of the fluidic lens can also be conveniently adjusted by simply changing the flow rates of one or both fluids.

The embodiment of our lens shown in FIG. 1 has an input light that is guided to the lens by an optical fiber connected to a light source. The optical fiber is located near the exit, or output end, of the 90 degree curve where the cylindrical lens is formed. The image of the focused light can be observed from the other side of the channel.

The behavior of the calcium chloride solution and distilled water were studied using computational fluid dynamic ("CFD") simulation and the resulted fluidic interface profiles were used for optic ray tracing simulation, which is shown below in FIGS. 2A-2C. The simulation results showed that the curved fluidic interface can be used to focus the light and that the lens profile and focal length can be tuned by changing the flow rate of the water, the calcium chloride solution, or both fluids in the laminar flow of fluid in the channel. The mechanism by which the embodiment of the optofluidic cylindrical lens operates is also illustrated in FIGS. 2D and 2E.

FIGS. 3A-3C illustrate the direct visualization of focused light at different flow rates that may be provided by the lens shown in FIG. 1. While this device is able to adjustably focus light, it is unable to adjust the angle at which light is reflected by a lens. Instead, the light is only able to be reflected in the direction the light is emitted. Further, the above mentioned lens shown in FIG. 1 has structural limitations that may be detrimental to fabrication and use of the lens. For instance, a light emitting device is configured for passing light through a portion of fluid passing through a straight portion of the channel and further requires the channel to be curved. Such structural limitations are undesirable and are design constraints. Such a lens usually must be configured to have fluid flowing in a direction that is perpendicular to the light passing through the channel. Further, the curved path defined by the channel was believed to be necessary to perturb the fluids via a Dean flow effect to cause the flat fluidic interface to bow outwardly and form a cylindrical microlens for reflecting light from a light emitting device.

Typically, liquid-liquid-interface-based microlens designs have two major shortcomings. Firstly, diffusion of solute across the fluid-fluid interface tends to smear the fluid-fluid interface, and therefore, a high flow rate is required to minimize the diffusion time and maintain a relatively clear liquid-liquid interface. Secondly, most of the current liquid-liquid-interface-based microlenses are only capable of line focusing (1D focusing), instead of point focusing (2D focusing). This is because current microfluidic technology has not yet been able to provide a means to conveniently create the precisely controlled, 3D liquid-liquid interface needed for 2D focusing.

A new lens device is needed that can provide a precisely controllable 3D liquid-liquid interface that may be used for 2D focusing of light. Such a lens device is also preferably configured to avoid smearing at any liquid-liquid interface. Such a lens device may additionally be preferably developed such that a curved channel is not necessary so that a wide variety of design configurations may be utilized for embodiments of such a lens device.

SUMMARY OF THE INVENTION

A lens device includes a substrate that has a channel, a first fluid path and a second fluid path. The first and second fluid paths are at least partially in communication with the channel. A light emitting device is positioned adjacent to the channel. At least one first fluid source is in communication with the first fluid path so that a first fluid is moveable along the first fluid path. At least one second fluid source is in communication with the second fluid path such that a second fluid is moveable along the second fluid path. The first and second fluid paths are configured so that the first fluid and the second fluid move through the channel to define an adjustable liquid gradient refractive index distribution in the channel. Adjustment of the liquid gradient refractive index distribution may permit an angular adjustment of light emitted by the light emitting device, an adjustment of a focal distance of the light emitted by the light emitting device, or both a focal distance adjustment and an angular adjustment of the emitted light.

In some embodiments of the lens device, the channel may be a lens chamber and the liquid gradient refractive index distribution may be adjustable by adjusting at least one of a flow rate of the first fluid and a flow rate of the second fluid.

The one or more first fluid sources may include a solution inlet and one or more water inlets. The one or more second fluid sources may also include a solution inlet and one or more water inlets. Adjustment of water flow of the first at least one first fluid source, the at least one second fluid source, or both the at least one first fluid source and at least one second fluid source may adjust the liquid gradient refractive index distribution in the channel.

The lens device may have an optical axis along which the light emitting device is aligned for emitting light along that axis. Movement of the first fluid and movement of the second fluid may be configured so that adjustment of at least a portion of flow of the first fluid or flow of the second fluid shift the optical axis of the lens device.

Preferably, the lens device is sized and configured for a lab on a chip application and the substrate is a microchip or a nano-chip.

One or more pumps may also be included in embodiments of the lens device. Such pumps may be, for example, syringes or other pump devices that may provide means of controlling or causing a flow rate for a fluid moving along a fluid path defined in the substrate. For example, an embodiment of the lens device may include a first pump that may be configured to control a flow rate of water of the first fluid and a second pump may be configured to control a flow rate of calcium chloride solution of the first fluid. A third pump may be configured to a flow rate of water of the second fluid and a second pump may be configured to control a flow rate of calcium chloride solution of the second fluid.

Embodiments of the lens device may be configured to angularly adjust light emitted by the light emitting device so that light is reflected so that the reflected light is positioned off of an optical axis of the light emitted by the light emitting device.

Light from the light emitting device may be configured to pass through the channel in a direction that is parallel to a direction the first and second fluids flow through the channel or may be in a direction that is perpendicular or transverse to the directions the first and second fluids flow through the channel. In one embodiment, the light may pass vertically through the channel and the first and second fluids may flow horizontally relative to the passage of the light through the channel.

Another embodiment of the lens device includes a substrate that has a channel and a first fluid flow path and a second fluid flow path defined therein. The first and second fluid flow paths are at least partially in communication with the channel. One or more first fluid sources are in communication with the first fluid flow path so that a first fluid is moveable along the first fluid flow path. One or more second fluid sources are in communication with the second fluid flow path so that a second fluid is moveable along the second fluid flow path. The first and second fluid flow paths are configured so that the first and second fluids move through the channel to define an adjustable liquid gradient refractive index distribution in the channel. Adjustment of the light gradient refractive index distribution permits an angular adjustment of light that passes through the channel via a light emitting device positioned adjacent to the substrate.

The one or more first fluid sources may include a first inlet, a second inlet and a third inlet positioned between the first and second inlets. The third inlet may be configured to feed a material that is different than material fed via the first inlet and is also different than material fed via the second inlet. For instance, the third inlet may feed a solution and the first and second inlets may feed water. The material fed via the third inlet may be fed at a rate that is different than the rate at which material fed via the first inlet and second inlets. The material fed via the first inlet may be fed at a greater rate or a rate equal to the rate at which material is fed via the second inlet.

The one or more second fluid sources may include a first inlet, a second inlet and a third inlet positioned between the first and second inlets. The third inlet may be configured to feed a material that is different than material fed via the first inlet and is also different than material fed via the second inlet. For instance, the third inlet may feed a solution and the first and second inlets may feed water. The material fed via the third inlet may be fed at a rate that is different than the rate at which material fed via the first inlet and second inlets. The material fed via the first inlet may be fed at a greater rate or a rate equal to the rate at which material is fed via the second inlet.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of our lens device and methods of making the same are shown in the accompanying drawings.

It should be understood that the water flow rates for the first and second fluid paths referenced in FIGS. 9G through 9K are exemplary. It should be appreciated that different embodiments of the L-GRIN lens device may be configured to utilized various other alternative flow rates for a calcium chloride solution, water or other fluids that may be used within each fluid path of the device. For instance, it is contemplated that a different solution other than calcium chloride solution may be used in embodiments of the L-GRIN lens device.

Figure 10:
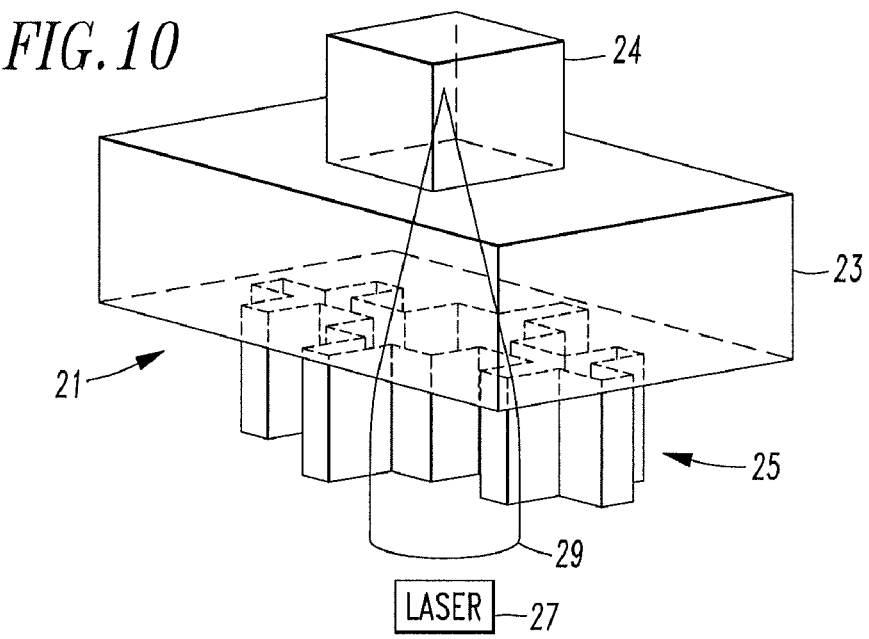

FIG. 10 is a schematic view illustrating another present preferred embodiment of our L-GRIN lens.

Figure 11:
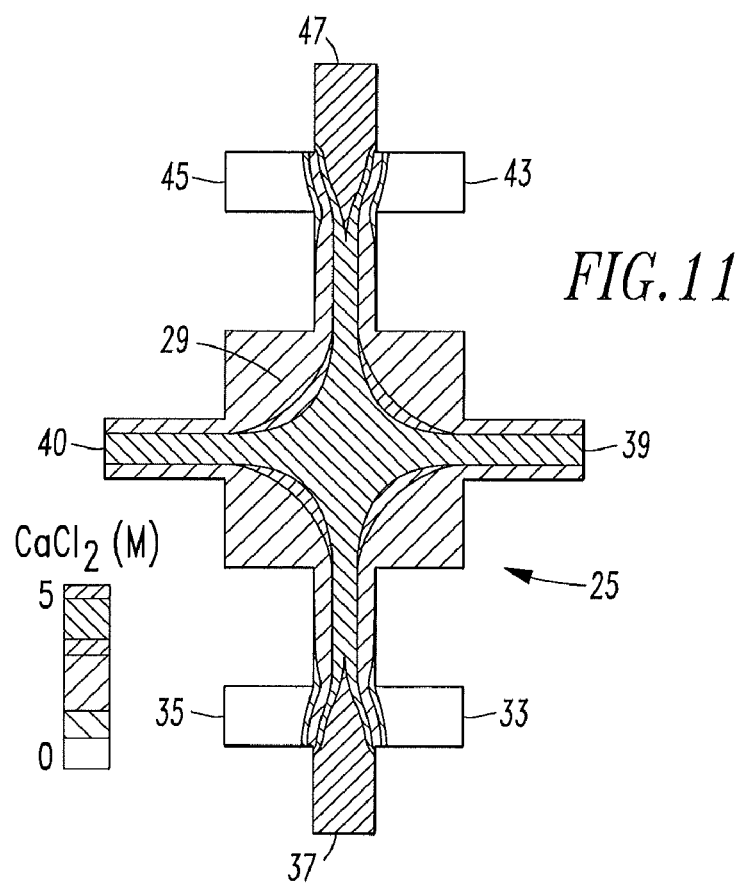

FIG. 11 is a schematic view illustrating present preferred fluid paths and a channel, which may be referred to as a lens chamber, utilized in the third present preferred embodiment of our L-GRIN lens.

Figure 12:
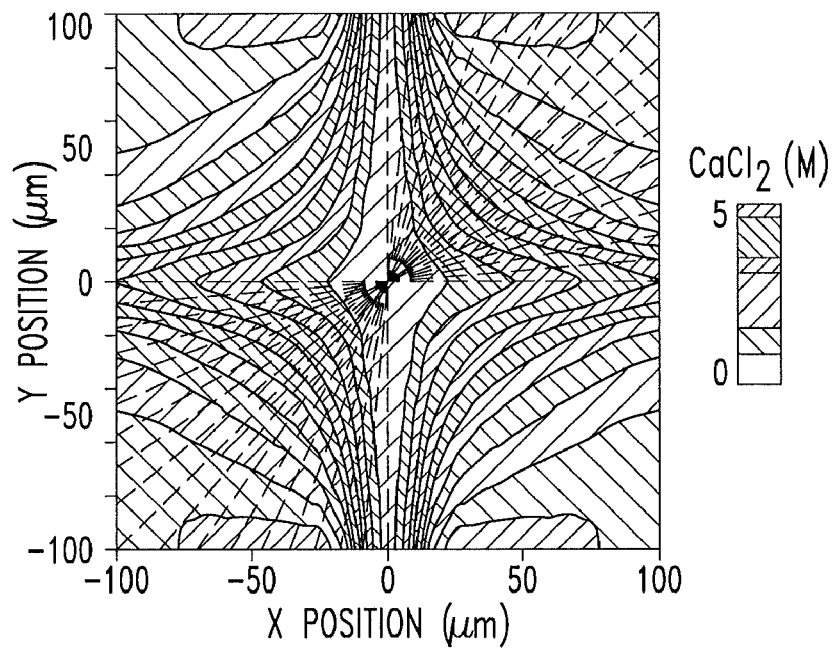

FIG. 12 is a graph illustrating a refractive index distribution in the lens chamber of the third present preferred embodiment of our L-GRIN lens.

Figure 13:
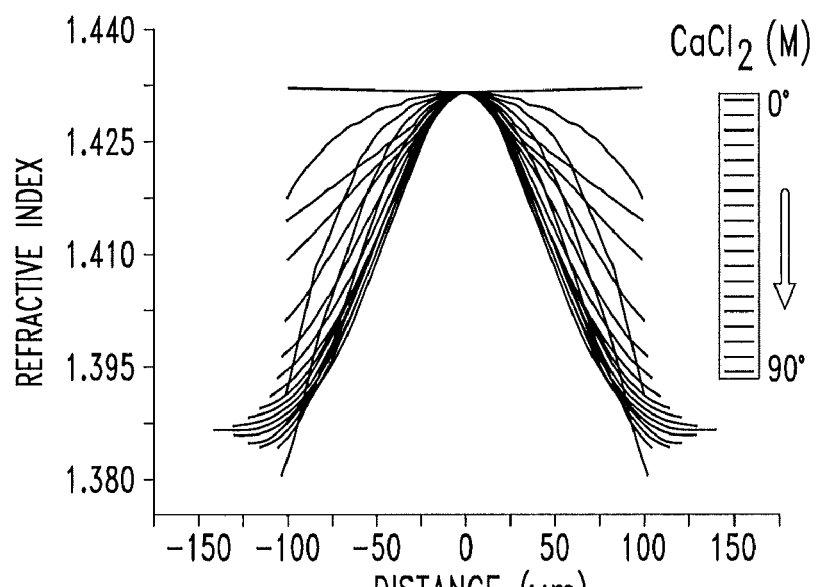

FIG. 13 is a graph illustrating a line profile of the refractive index in the X-Y plane of the third present preferred embodiment of the L-GRIN lens device along different directions from 0° to 90° with a 5° increment.

Figure 14:
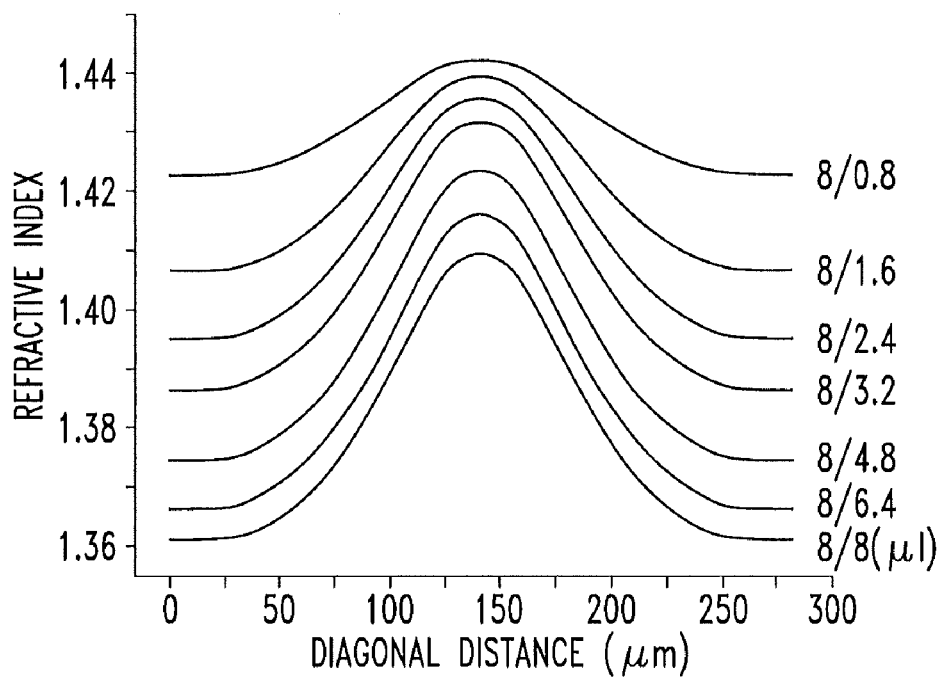

FIG. 14 is a graph illustrating the change of the refractive index profile with different fluid rates ($\beta$ at 45°) of the third present preferred embodiment of the L-GRIN lens device.

Figure 15:
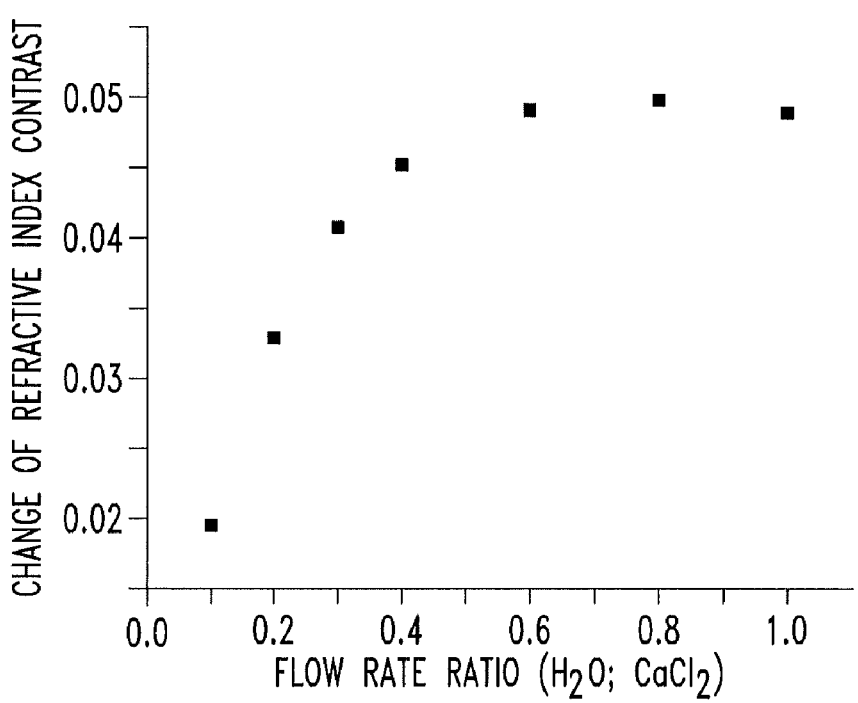

FIG. 15 is a graph illustrating the change of the refractive index contrast that may occur with respect to a change of the flow rate ratio between water and $CaCl_2$ solution for each fluid path of the third present preferred embodiment of the L-GRIN lens device.

Figure 16:
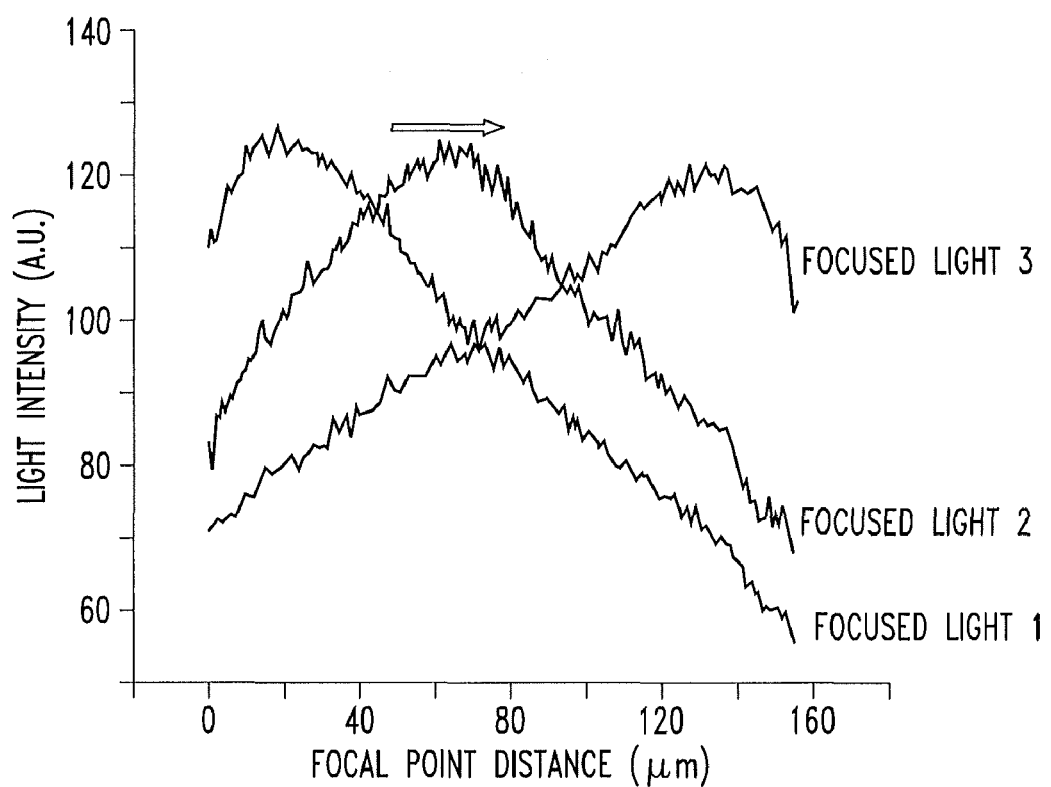

FIG. 16 is a graph illustrating light intensity plots along a Z axis indicating the shift of a focal point of light found to occur during experimentation for the third present preferred embodiment of the L-GRIN lens device.

Figure 17:
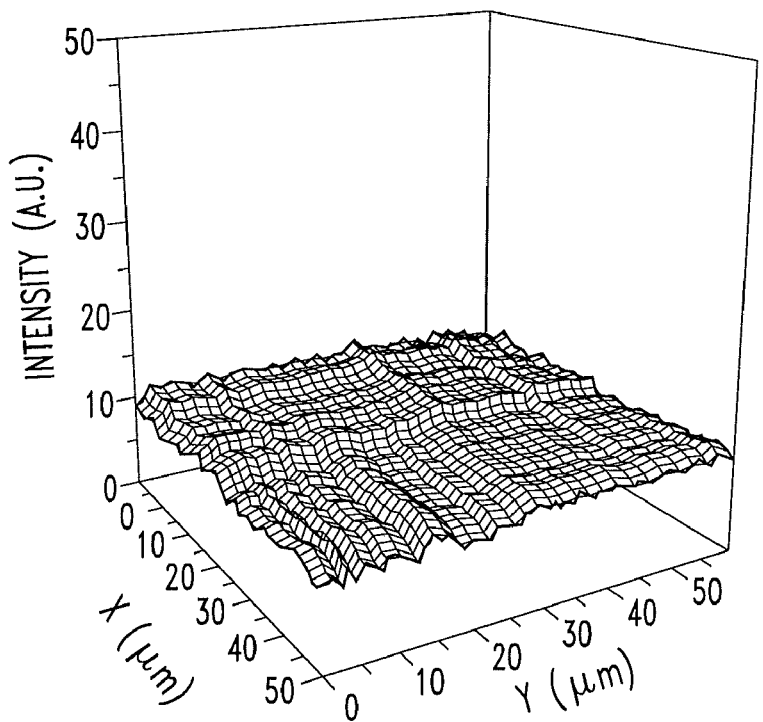

FIG. 17 is a graph illustrating the 2D light intensity distribution corresponding to a stagnant flow of fluid for each fluid path of the third present preferred embodiment of the L-GRIN lens device.

Figure 18:
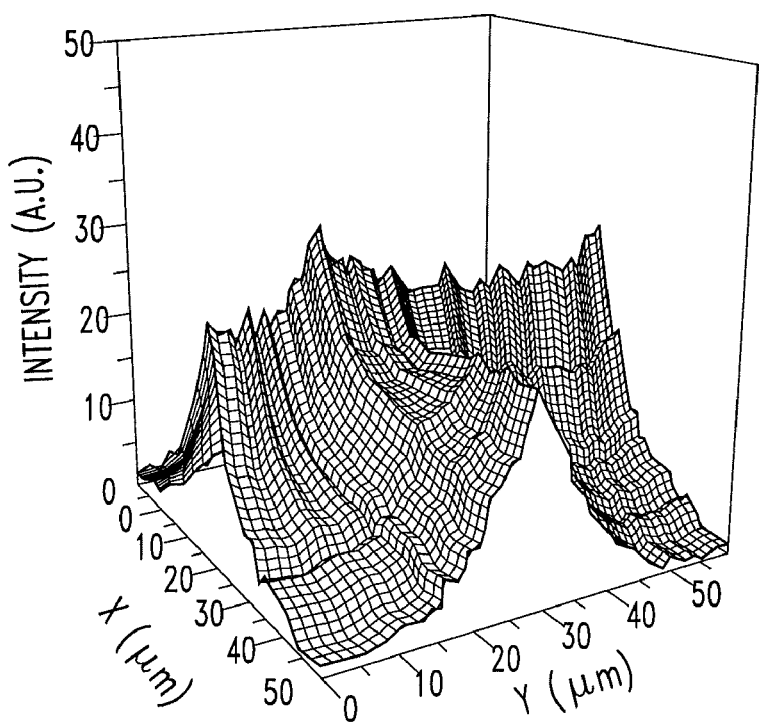

FIG. 18 is a graph illustrating the 2D light intensity distribution corresponding to a distilled water flow rate for 6.4 microliters per minute and a $CaCl_2$ solution flow rate of 8.0 microliters per minute for each fluid path of the third present preferred embodiment of the L-GRIN lens device.

Figure 19:
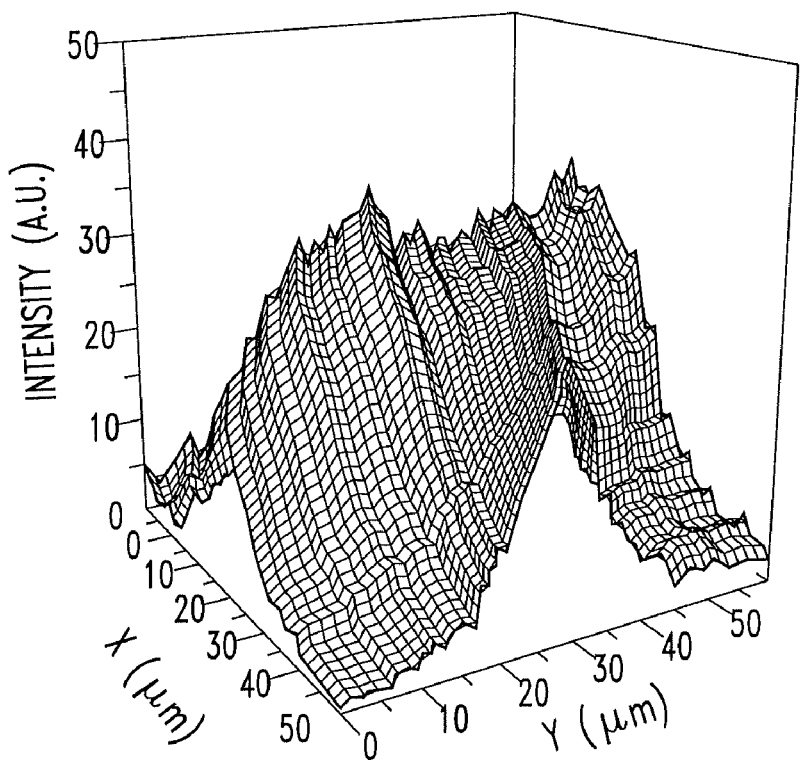

FIG. 19 is a graph illustrating the 2D light intensity distribution corresponding to a distilled water flow rate for 4.8 microliters per minute and a CaCl$_2$ solution flow rate of 8.0 microliters per minute for each fluid path of the third present preferred embodiment of the L-GRIN lens device.

Figure 20:
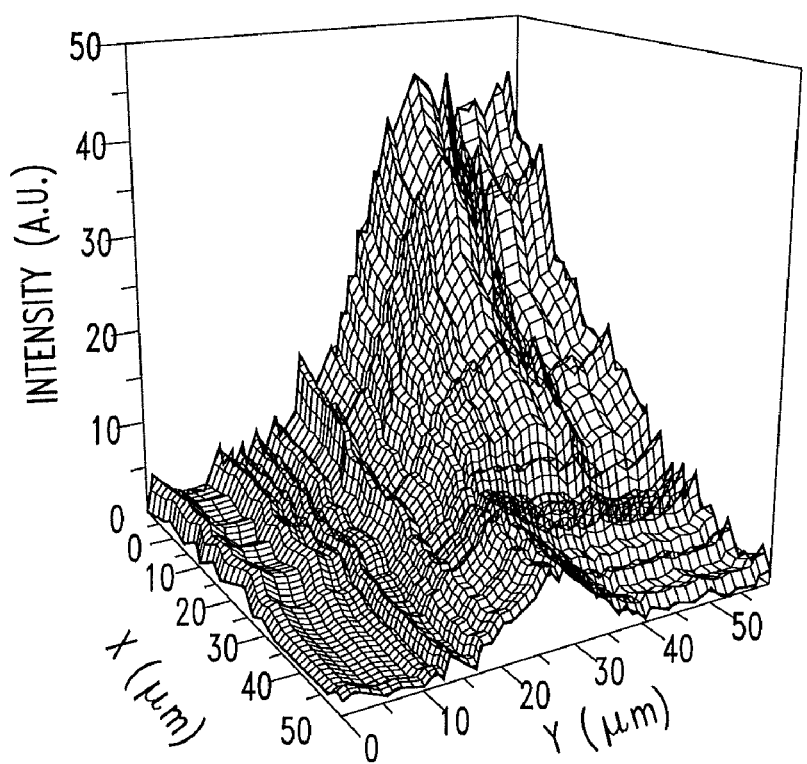

FIG. 20 is a graph illustrating the 2D light intensity distribution corresponding to a distilled water flow rate for 3.2 microliters per minute and a CaCl$_2$ solution flow rate of 8.0 microliters per minute for each fluid path of the third present preferred embodiment of the L-GRIN lens device.

Figure 21:
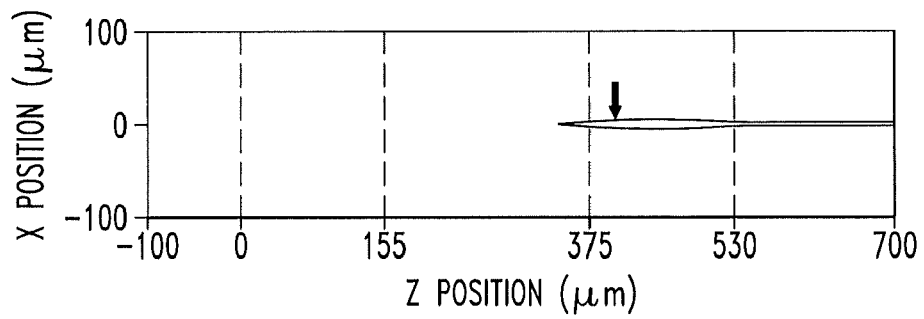

FIG. 21 is an illustration of a first trajectory of light from the third present preferred embodiment of our L-GRIN lens when a distilled water flow rates of 8.0 microliters per minute and a CaCl$_2$ solution flow rate of 8.0 microliters per minute pass through both fluid paths of the third present preferred embodiment of the L-GRIN lens device.

Figure 22:
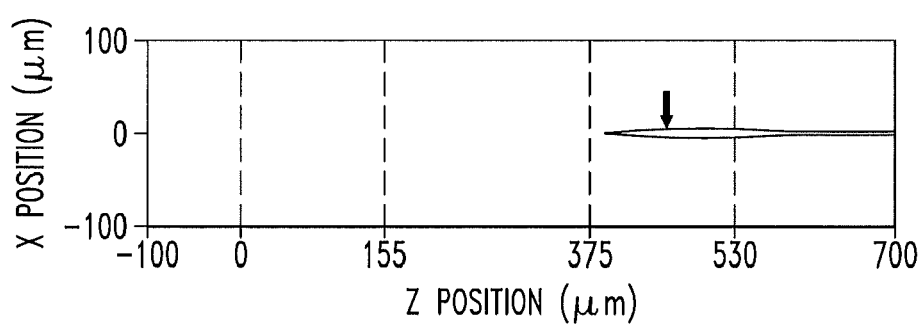

FIG. 22 is an illustration of a second trajectory of light from the third present preferred embodiment of our L-GRIN lens when a distilled water flow rates of 3.2 microliters per minute and a CaCl$_2$ solution flow rate of 8.0 microliters per minute pass through both fluid paths of the third present preferred embodiment of the L-GRIN lens device.

Figure 23:
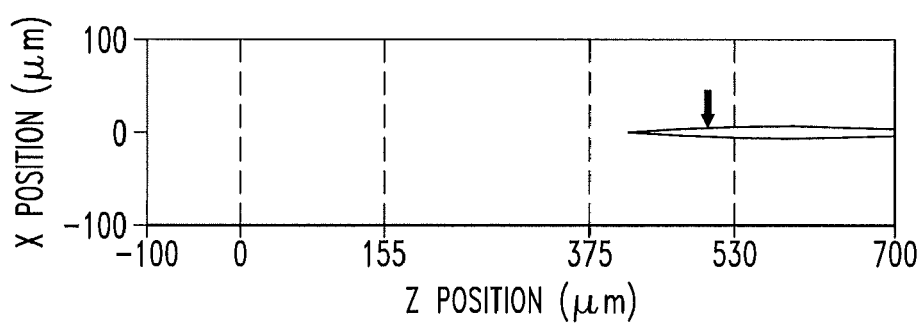

FIG. 23 is an illustration of a third trajectory of light from the third present preferred embodiment of our L-GRIN lens when a distilled water flow rates of 2.4 microliters per minute and a CaCl$_2$ solution flow rate of 8.0 microliters per minute pass through both fluid paths of the third present preferred embodiment of the L-GRIN lens device.

DETAILED DESCRIPTION OF PRESENT PREFERRED EMBODIMENTS

We provide herein embodiments of a tunable lens device that provides variable focusing and scanning and a method of making and using the same. Embodiments of our lens device may be configured as a microlens that is configured for use on lab-on-a-chip devices or for use in devices configured to provide or help provide a medical diagnosis. Embodiments of our lens device can permit both a varying of the focal length and beam direction of light using a lens that has an area less that 1 square millimeter (mm$^2$). Embodiments of our lens device may utilize the refractive index distribution in liquids to variably focus light and, therefore, may not require any complex mechanical or electrical components. Embodiments of our lens device may be configured for use in small diagnostic medical probes such as endoscopes or light focusing elements in lab-on-a-chip devices. Of course, embodiments of our lens device may also be used in other applications and in other devices.

For lenses that are in-plane lenses, or lenses that lack a substantially or significantly curved refractive portion that refracts light at the curve surface of the lens body, it is difficult to adapt lens-surface tuning mechanisms such as electrowetting, responsive hydrogel, and pressure actuated membranes to tune the refracted light. This problem is due, at least in part, to the planar structure of the lens. Embodiments of our lens discussed herein can permit tuning of reflected light by a planar lens or a substantially planar lens.

Figure 1:
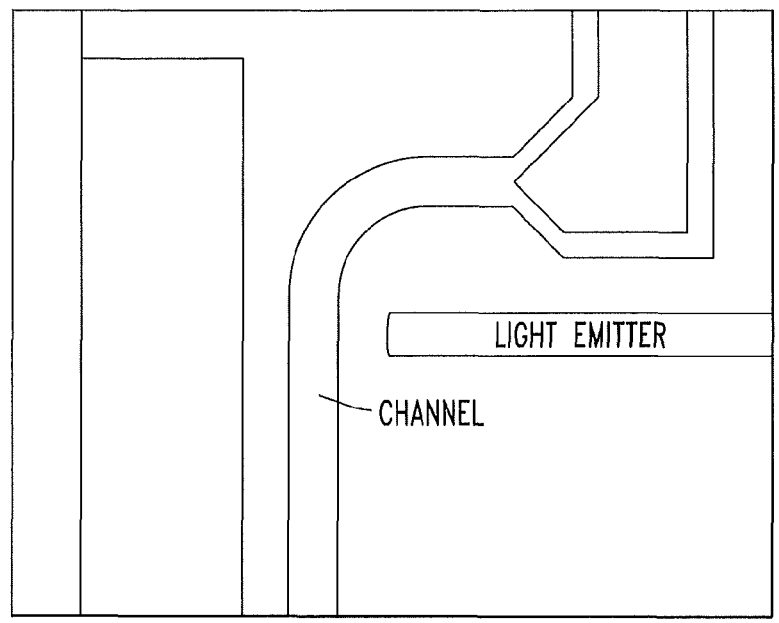
FIG. 1 is a microscopic image of a prior art lens device.
Figure 4:
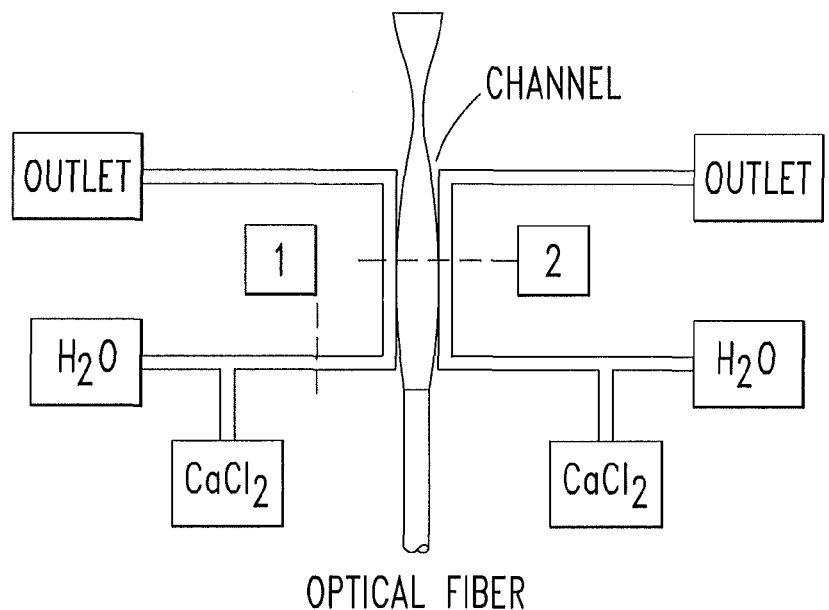
FIG. 4 is a schematic view of a first present preferred embodiment of our Liquid Gradient Refractive Index ("L-GRIN") lens device.
Figure 2A:
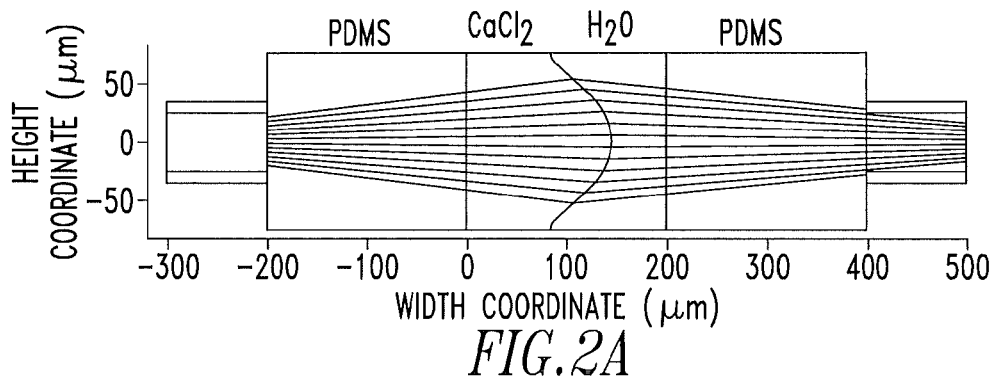
FIG. 2A is a representation of a firstoptic ray profile that may be provided by the prior art lens device shown in FIG. 1.
Figure 2B:
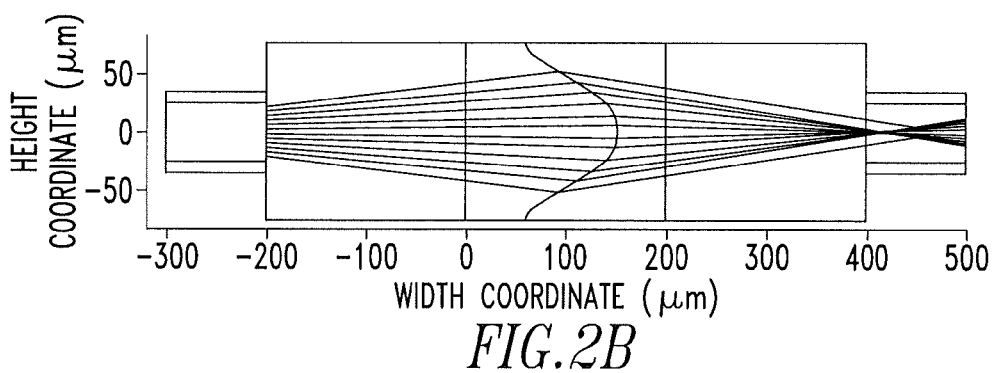
FIG. 2B is a representation of a second optic ray profile that may be provided by the prior art lens device shown in FIG. 1.
Figure 2C:
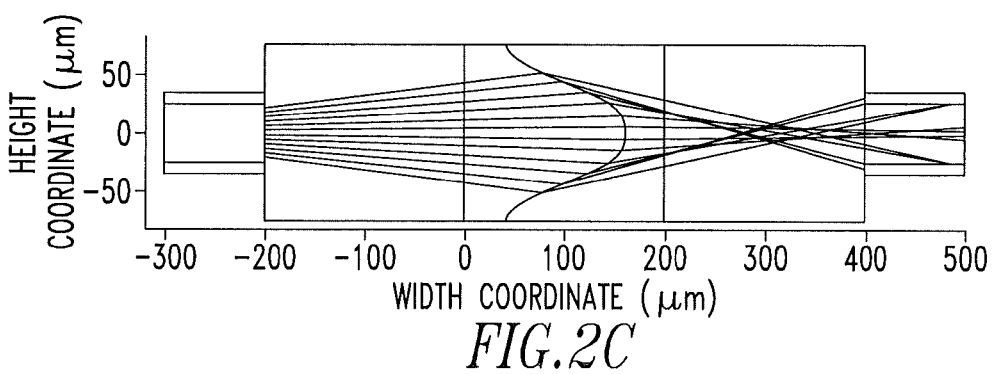
FIG. 2C is a representation of a third optic ray profile that may be provided by the prior art lens device shown in FIG. 1.
Figure 2D:
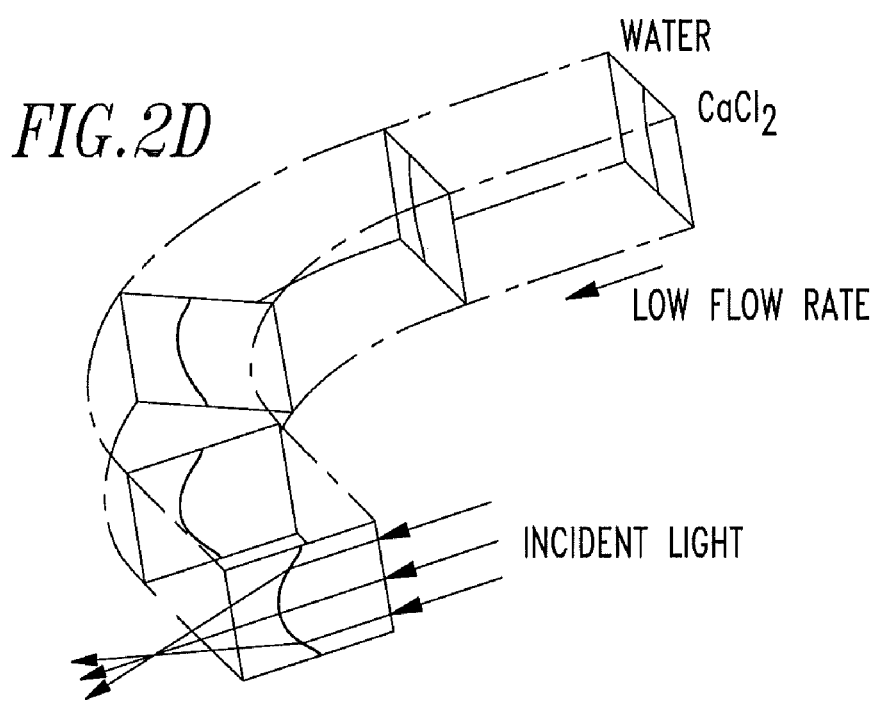
FIG. 2D is a schematic illustration of a mechanism by which at least some embodiments of the lens device shown in FIG. 1 operates.
Figure 2E:
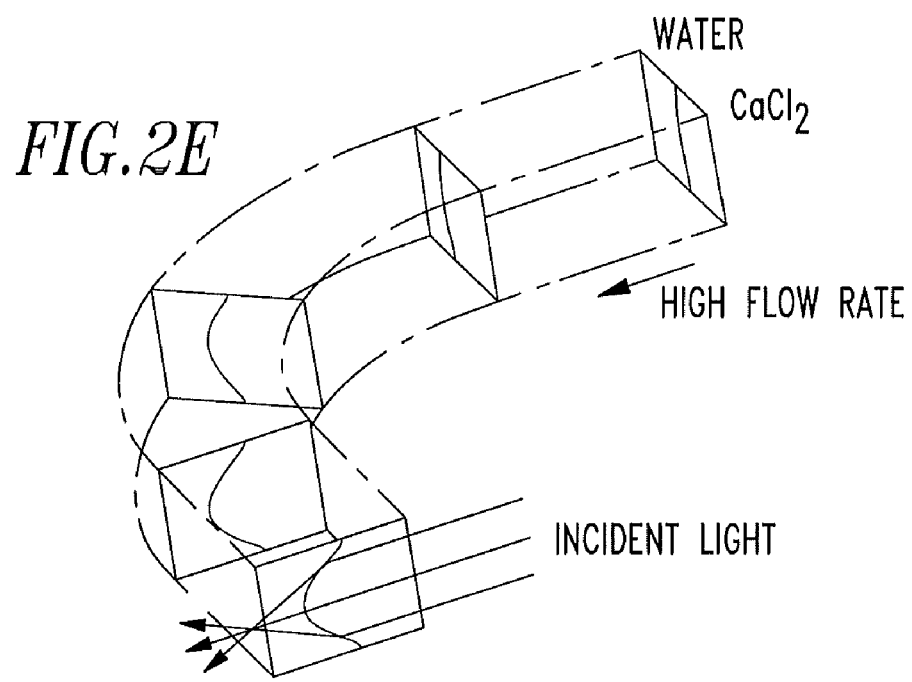
FIG. 2E is a schematic illustration of a mechanism by which at least some embodiments of an optofluidic cylindrical lens that utilizes a structure shown in FIG. 1 operates.

An embodiment of a microlens is illustrated in FIG. 4, which shows a schematic view of an L-GRIN lens device. The lens device of the embodiment shown in FIG. 4 is configured to be an in-plane tunable microlens that does not require a curved lens surface. The lens device includes four inlets, two inlets for calcium chloride solution flows and two for water flows. The lens also has two outlets in communication with the inlets. The calcium chloride solution and water are configure to flow from respective inlets to the outlets in two different flow paths that define a channel that has a length of 100 μm, 250 μm, 400 μm, or other length. The channel width may be 160 μm or be sized at a different width. It should be appreciated that the channel width, length and height may be sized and configured for various different shapes or arrangements. A polydimethylsiloxane (PDMS) membrane may be positioned between the channel and a light source, such as an optical fiber. The PDMS may be 100 μm thick or may be of a different size or configuration. The optical fiber may be a multi-mode optical fiber that has an outer diameter of 155 μm, and a core diameter of 50 μm, and a nominal numerical aperture NA of 0.22. The optical fiber may be aligned with the channel by a guide channel such that the light passes through the channel in a direction that is parallel with the flow of the fluid passing through the channel. The lens device may be formed on a substrate, such as the substrate of a microchip or nanochip. The substrate may be composed of silicon or other elements. The substrate preferably defines the channel and the fluid flow paths for the water and calcium chloride solution.

It should be understood that a pump may be attached to each fluid flow to control the flow rate of the fluids. For instance, a pump may be attached to each water and calcium chloride inlet to drive or control the flow rates of the fluid components through the channel or drive or control the flow rates of the fluids through the channel.

The channel and the inlets and outlets of the lens are preferably configured to provide a hyperbolic secant refractive index profile within the channel. Of course, it should be understood that the inlets, outlets and the channel could be configured to provide other refractive index profiles, such as a parabolic profile or any other refractive index profile that facilitates focusing of the light. The refractive index of the flows are linearly dependent on the concentration of calcium chloride. The calcium chloride solutions and water form side by side laminar flows as they converge adjacent the channel. The flows may be controlled by pumps (not shown) attached to the flows. As diffusion occurs between the water and the calcium chloride in both flows adjacent to the channel, a refractive index profile that resembles a half hyperbolic secant profile is established adjacent each flow. Fluids from both sides converge in the main channel to establish a hyperbolic secant refractive index profile.

Input light coupled from one end of the lens can then be focused on the other side through a continuous bending of light trajectory in the refractive index gradient, which may be adjusted to tune the lens by adjusting the flow rates of the water or calcium chloride solution. The light may be provided by an optical fiber, a light emitting diode, a halogen white light source, or a laser diode. Different flow rates for the flows may adjust the focus of the light in different ways. FIG. 5 illustrates examples of different light refraction that may be provided by such flow adjustment.

The configuration of the lens structure for the embodiment of our lens shown in FIG. 4 may be referred to as a liquid gradient refractive index ("L-GRIN") lens because its focusing mechanism resembles that of a gradient refractive index ("GRIN") lens widely used for light collimation and coupling.

GRIN lenses typically have a flat structure and a variable refractive index that is perpendicular to its optical axis. Light that travels through the optical axis within a GRIN lens is bended gradually toward the optical axis and brought to a focal point after it exits the lens. A variety of gradient profiles such as parabolic and hyperbolic secant profiles may be provided by such lenses. Existing GRIN lenses are solid state and do not permit adjustment of the focal length of the lens because their refractive index profiles are fixed.

In contrast, our L-GRIN lens device, an embodiment of which is shown in FIG. 4, can be configured to adjust the focal length of the lens by adjusting the flow condition or flow rate of the calcium chloride, the distilled water or both fluids in one or both fluid paths. It should also be understood that the refractive index of the L-GRIN lens is much easier to configure relative to GRIN lenses because a challenging diffusive ion exchange process via solid glass material is not required. Instead, the L-GRIN lens configuration shown in FIG. 4 can permit creation of a desired refractive index gradient by controlling the diffusion rates of a solute, such as calcium chloride, in a microfluidic channel.

Figure 6:
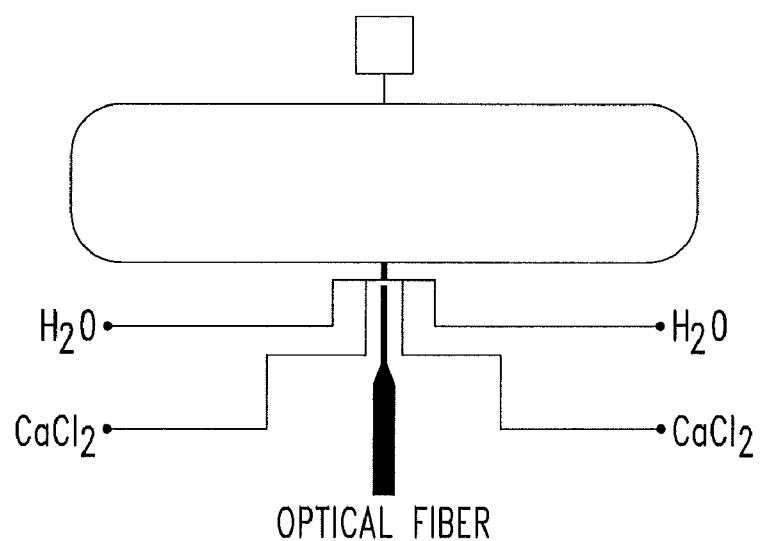
FIG. 6 is a schematic view of a second present preferred embodiment of our L-GRIN lens.
Figure 7:
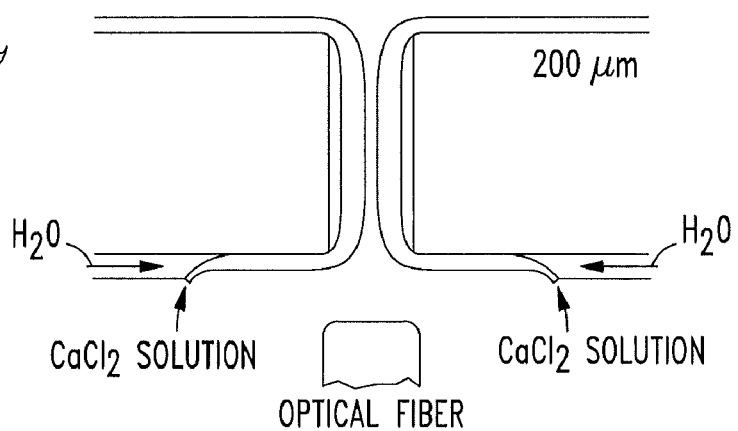
FIG. 7 is an enlarged view of the channel of the second present preferred embodiment of our L-GRIN lens.
Figure 8A:
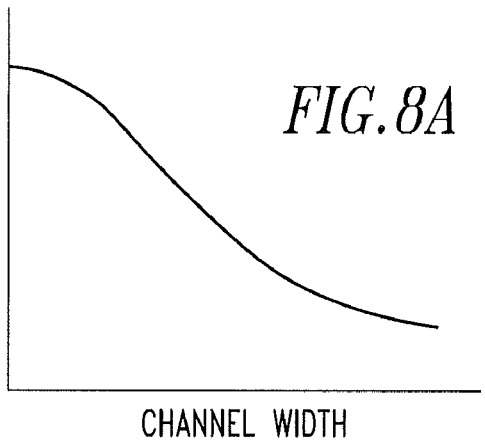
FIG. 8A is a graph illustrating the refractive index of the light at position I shown in FIG. 7.
Figure 8B:
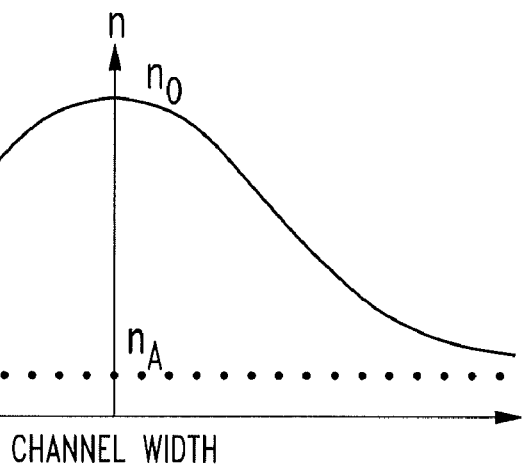
FIG. 8B is a graph illustrating the refractive index of the light passing through the channel at position II shown in FIG. 7.

Another embodiment of an L-GRIN lens configuration is shown in FIGS. 6 and 7. The refractive index provided by the flows of the calcium chloride and distilled water flows at locations I and II shown in FIG. 7 is illustrated in FIG. 8.

Preferably, a calcium chloride solution that has a molarity of 3.5 M is used as the calcium chloride solution. Preferably, the flow rates of the water and calcium chloride solution are $3.0\,\mu\text{lm}^{-1}$ and $1.8\,\mu\text{lm}^{-1}$ respectively. Of course, the refractive index of the flows is dependent on the calcium chloride concentration. In some embodiments, other solutes or other calcium chloride solutions may be used. For instance, a calcium chloride solution having a molarity of 5 M may be used.

As may be appreciated from the above FIG. 5, embodiments of our lens may adjust the focal length of the lens. The focal length may be changed by adjusting the flow rates of only the water, only the calcium chloride solution, or both the water and the calcium chloride solution. For instance, adjustment of the water flow rate from both sides of the channel can adjust the focal lengths to provide no focusing of light, a large focal length or a short focal length, as may be appreciated from the translation mode schematics shown in the "translation mode", which may be appreciated from FIGS. 5A, 5B and 5C. Alternatively, the flow of water on only one side of the channel may be adjusted to shift the optical axis of the lens. Such shifting adjusts the angle at which the light is reflected, as may be appreciated in the "swing mode", which may be appreciated from FIGS. 5D and 5E.

Figure 9A:
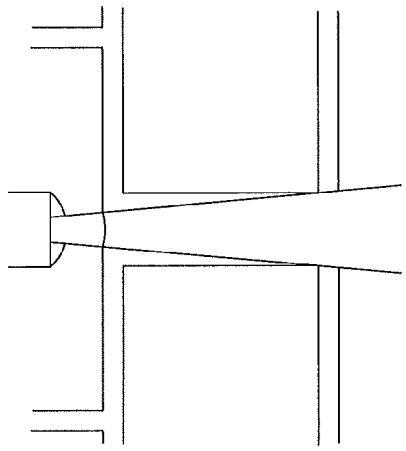
FIG. 9A illustrates a flow condition of a fixed calcium chloride solution flow rate in both fluid paths and with a first water flow rate for both fluid paths for the second present preferred embodiment of the L-GRIN lens.
Figure 9B:
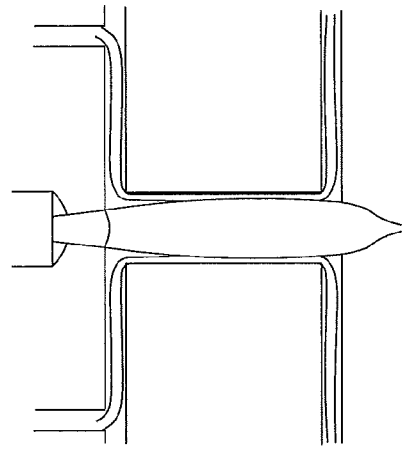
FIG. 9B illustrates a flow condition of a fixed calcium chloride solution flow rate in both fluid paths and with a second water flow rate for both fluid paths for the second present preferred embodiment of the L-GRIN lens. The second water flow rate is greater than the first water flow rate.
Figure 9C:
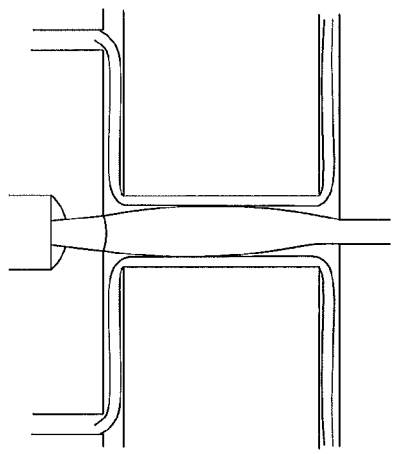
FIG. 9C illustrates a flow condition of a fixed calcium chloride solution flow rate in both fluid paths and with a third water flow rate for both fluid paths for the second present preferred embodiment of the L-GRIN lens. The third water flow rate is greater than the second water flow rate.
Figure 9D:
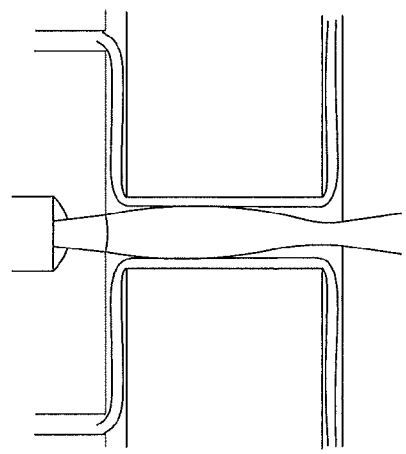
FIG. 9D illustrates a flow condition of a fixed calcium chloride solution flow rate in both fluid paths and with a fourth water flow rate for both fluid paths for the second present preferred embodiment of the L-GRIN lens. The fourth water flow rate is greater than the third water flow rate.
Figure 9E:
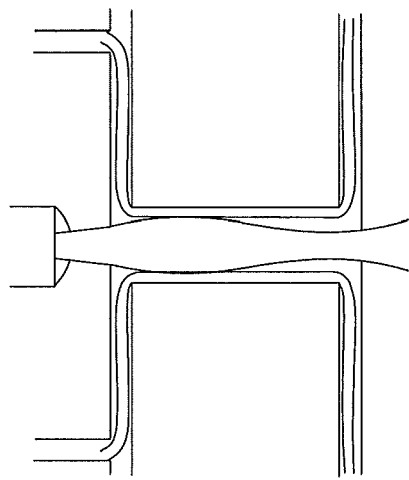
FIG. 9E illustrates a flow condition of a fixed calcium chloride solution flow rate in both fluid paths and with a fifth water flow rate for both fluid paths for the second present preferred embodiment of the L-GRIN lens. The fifth water flow rate is greater than the fourth water flow rate.
Figure 9F:
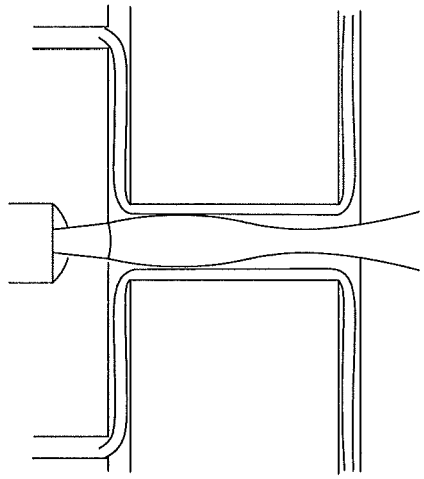
FIG. 9F illustrates a flow condition of a fixed calcium chloride solution flow rate in both fluid paths and with a sixth water flow rate for both fluid paths for the second present preferred embodiment of the L-GRIN lens. The sixth water flow rate is greater than the fifth water flow rate. Examples of the flow rates that may be utilized as shown in FIGS. 9A through 9F may be appreciated from U.S. Provisional Patent Application Ser. No. 61/225,610. The entirety of U.S. Provisional Patent Application Ser. No. 61/225,610 is incorporated herein by reference.
Figure 9G:
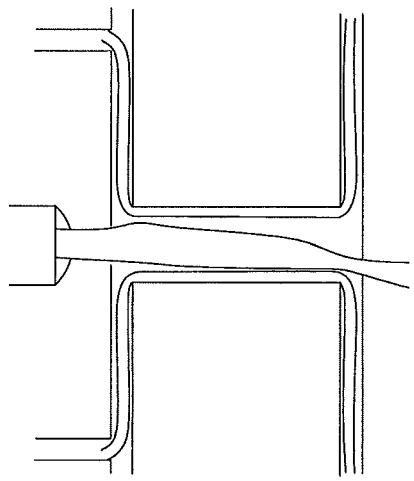
FIG. 9G illustrates a flow condition of a fixed calcium chloride solution flow rate of 3.0 microliters per minute in both fluid paths and with a seventh water flow rate in the first fluid path and an eighth water flow rate on the second fluid path for the second present preferred embodiment of the L-GRIN lens. The seventh water flow rate is 5.4 microliters per minute and the eighth water flow rate is 0.6 microliters per minute.
Figure 9H:
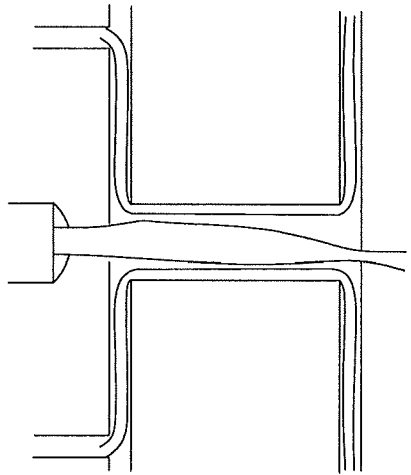
FIG. 9H illustrates a flow condition of a fixed calcium chloride solution flow rate of 3.0 microliters per minute in both fluid paths and with a ninth water flow rate in the first fluid path and a tenth water flow rate in the second fluid path for the second present preferred embodiment of the L-GRIN lens. The ninth water flow rate is 4.2 microliters per minute and the tenth water flow rate is 1.8 microliters per minute.
Figure 9I:
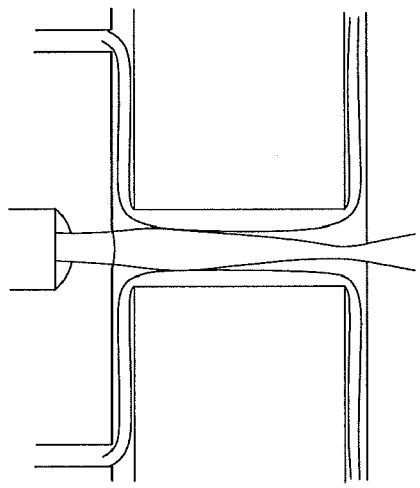
FIG. 9I illustrates a flow condition of a fixed calcium chloride solution flow rate of 3.0 microliters per minute in both fluid paths and with an eleventh water flow rate in the first fluid path and a twelfth water flow rate in the second fluid path for the second present preferred embodiment of the L-GRIN lens. The eleventh water flow rate is 3.0 microliters per minute and the twelfth water flow rate is 3.0 microliters per minute.
Figure 9J:
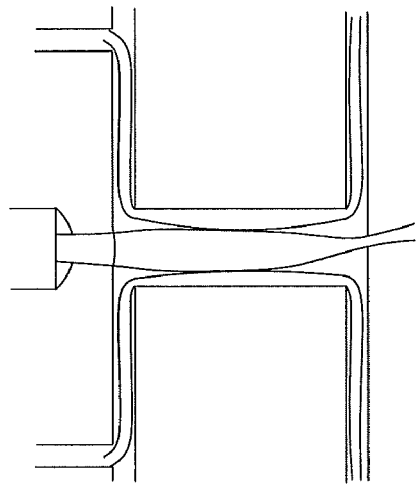
FIG. 9J illustrates a flow condition of a fixed calcium chloride solution flow rate of 3.0 microliters per minute in both fluid paths and with a thirteenth water flow rate in the first fluid path and a fourteenth water flow rate in the second fluid path for the second present preferred embodiment of the L-GRIN lens. The thirteenth water flow rate is 1.8 microliters per minute and the fourteenth water flow rate is 4.2 microliters per minute.
Figure 9K:
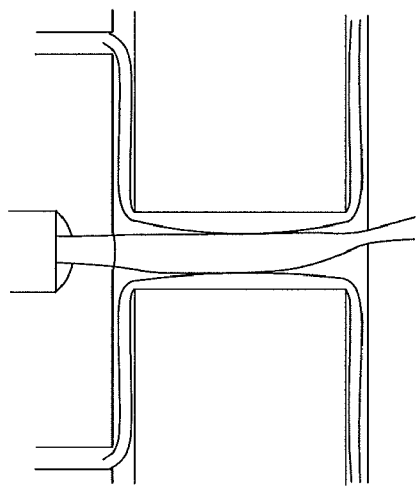
FIG. 9K illustrates a flow condition of a fixed calcium chloride solution flow rate of 3.0 microliters per minute in both fluid paths and with a fifteenth water flow rate in the first fluid path and a sixteenth water flow rate in the second fluid path for the second present preferred embodiment of the L-GRIN lens. The fifteenth water flow rate is 0.6 microliters per minute and the sixteenth water flow rate is 5.4 microliters per minute.

Ray tracing experiments have also been conducted to show the variable focusing positions at different flow conditions. FIGS. 9A-9F illustrate the results of such experiments. FIG. 9A shows a stagnant flow for a homogenous refractive index. FIGS. 9B through 9F show a flow condition of a fixed calcium chloride solution flow rate in both fluid paths and with progressively increased water flow rates for both fluid paths (increasing from FIG. 9B to FIG. 9F).

Ray tracing experiments have also been conducted to show the variable focusing and variable light positioning may be provided by utilizing different flow conditions in embodiments of the L-GRIN lens device. FIGS. 9G-9K illustrate the results of such experiments. FIGS. 9G through 9K show a flow condition of a fixed calcium chloride solution flow rate in both fluid paths and with different water flow rates in the two fluid paths.

It should be understood that embodiments of our lens may be made by various standard fabrication methods such as soft-lithography. This is particularly true for embodiments of our lens device that are sized and configured for use in lab-on-a-chip applications.

Referring to FIG. 10, another present preferred embodiment of a L-GRIN lens device 21 may include a substrate 25 positioned between a laser 27 and a glass slide 23. A dye chamber 24 may be positioned above or adjacent to the glass slide 23 as well. The dye chamber 24 may retain a substance or structure utilized to make the light emitted by the laser 27 visible. In some embodiments, it is contemplated that a dye chamber would not be included as the light emitted by the laser may already be visible or the visibility of the light may not be necessary to the industrial applicability of the device.

The substrate 25 may define a plurality of fluid paths. A portion of each fluid path may pass into a lens chamber 29. The lens chamber may be a channel that defines the focal point position for light emitted by the laser. That focal point position may be located within the dye chamber 25. The chamber 25 may be generally straight and preferably does not include any curved portions.

The fluid paths defined by the substrate 25 may be appreciated from FIG. 11. A first fluid path may include a $CaCl_2$ solution inlet 37 positioned between two distilled water inlets 33 and 35. Fluid from these inlets may pass along a first fluid path to a first fluid outlet 39. A portion of that fluid path passes into the lens chamber 29. A second fluid path may include a $CaCl_2$ solution inlet 47 positioned between two distilled water inlets 43 and 45. Fluid from these inlets may pass along the second fluid path to a second fluid outlet 40. A portion of that fluid path passes into the lens chamber 29. FIGS. 12-14 illustrate the refractive index of the fluid within the lens chamber 29. FIG. 15 is a graph illustrating how the refractive index contrast may change as the flow rate ratio between the distilled water and calcium chloride changes in the flow of fluid along both fluid paths.

The fluid paths are configured so that fluid moving along those paths may define a light-focusing hyperbolic secant refractive index profile. Each fluid flow includes distilled water and $CaCl_2$. The flow rates of each fluid flow may be the same. Preferably, the fluid flow rates moving in each of the fluid paths and the rate at which the water and the $CaCl_2$ is being added to each fluid path via the inlets are the same for each fluid path. The outlets 39 and 40 may be sized and configured to permit the fluids passing through the first and second fluid paths to symmetrically exist the chamber from two different sides of the lens chamber.

In alternative embodiments, the outlets may be configured so that the fluid flowing in the first fluid path may be different than the flow rate of the fluid flowing in the second fluid path so that there is asymmetric exiting from the lens chamber.

Preferably, the substrate 25 is positioned above the laser relative to the plane on which the laser is positioned and is located below the planes on which the glass slide and dye chambers are located. For example, the lens chamber may be positioned so that the channel extends in a direction that is perpendicular to the light emitted from the laser. The flow of fluids in the fluid paths may also flow in directions that are perpendicular to the direction in which the light is emitted.

It should be appreciated that the hyperbolic secant ("HS") refractive index distribution for the plane of the lens chamber may determine the optical properties of the L-grin lens device 21.

The following equation describes the HS refractive index of the lens device 21:

$$n^2(d)=n_s^2+(n_o^2-n_s^2)\sec h^2(\alpha d).$$

Where n(d) is the refractive index of the solution with a transverse distance d from the center axis of the lens chamber, $n_o$ is the highest refractive index at the center axis of the L-GRIN lens, $n_s$ is the background (lowest) refractive index of the solution, and $\alpha$ is the gradient parameter determined by the refractive index profile. With such a 2D refractive index profile in the X-Y horizontal plane within the lens chamber 29, the vertical light beam can be focused two-dimensionally toward the center axis. The position of the focal point can also be tuned along the vertical axis, or Z direction, by changing the HS refractive index profile. Such a change may be achieved through adjusting the flow rate ratios between the high refractive index fluid, $CaCl_2$, and the low-refractive index fluid, distilled water, for each fluid path.

Experimentation was conducted as may be appreciated from FIGS. 12-22 to evaluate an embodiment of the lens device 21. The laser 27 was a 532 nm laser diode and was aligned to the center axis of the lens chamber 29 of the substrate 25 and shined vertically (z-direction) toward the lens chamber 29. The lens chamber was 155 micrometers thick, and had a width of 200 micrometers and a length of 200 micrometers. The dye chamber 24 was filled with fluorescent dye solution (Rhodamine B, 10 micrograms per milliliter) so that the trajectories of the focused light beams could be observed after the focusing process. The lens chamber 27 and the dye chamber 24 were made using standard soft lithography and mould replica procedures. The fluids were injected into the L-GIN lens chamber 29 using precision syringe pumps (KD Scientific 210) via the inlets.

The Experiments were conducted on an inverted optical microscope (Nikon TE 2000U) and images were taken by a color digital camera (Nikon D50) mounted on the microscope.

The performance of the lens device 21 was also evaluated using simulations. A computational fluid dynamics (CFD) was performed with a commercial software package (ESI-CFD) and was used for calculating the distribution of $CaCl_2$ concentration, which was linearly proportional to the refractive index distribution in the L-GRIN lens. Based on the data obtained from this simulation, the optical ray-tracing simulation was subsequently performed to simulate the trajectories of the light beams during the focusing process. The ray tracing algorithm for HS refractive index gradient was based on the ABCD law and was implemented with a MATLAB program. The analysis of the experimental result was conducted using an image analysis package, ImageJ. FIGS. 12-15 illustrate the data obtained from the simulation experimentation that was conducted. Further simulation results may also be appreciated from U.S. Provisional Patent Application Ser. No. 61/363,431. The entirety of U.S. Provisional Patent Application Ser. No. 61/363,431 is incorporated herein by reference.

An axis symmetric refractive index profile was obtained in the lens chamber by coinjecting the $CaCl_2$ solution with the distilled water into the lens chamber from two opposite directions, as may be appreciated from FIG. 11. The distilled water streams compress the $CaCl_2$ solution from both sides and the $CaCl_2$ molecules diffuse across the interface of the two fluids along both fluid paths.

The simulation results indicated that upon contacting with the distilled water, the $CaCl_2$ begins to diffuse from the $CaCl_2$ solution into the distilled water for each fluid moving along the first and second fluid paths. After the two opposite fluid flows pass into the lens chamber 29 on their respective fluid paths, they are forced to change their flow directions and exit the lens chamber 29 from outlets 39 and 40 symmetrically. The change in direction may be a change such that each flow moves from a first direction to a second direction that is transverse to the first direction. That transverse second direction may include a direction that is perpendicular to the initial direction. The diffusion of $CaCl_2$ in this process resulted in the formation of a light-focusing, 2D refractive index gradient in the lens chamber 29.

A graph illustrating the refractive index distribution was plotted using the $CaCl_2$ concentration distribution obtained from the CFD result. FIG. 12 illustrates that graph, which indicates that the refractive index in the lens chamber 29 may provide an axis-symmetric pattern in which the refractive index is higher in the center and lower towards the outer edges. A plot of the line profiles of the refractive index within the lens chamber 29 is shown in FIG. 13. Except for the lines near the directions of the inlets and outlets ($\beta=0°$ or $90°$), most refractive index profiles follow HS distribution and match well with each other. This characteristic insures that most of the incoming light sent via the laser 27 is focused to a single focal point.

The refractive index profiles of $CaCl_2$ at different fluid injection conditions were also simulated. FIG. 14 illustrates the change of change of diagonal distribution ($\beta=45°$) of $CaCl_2$ concentration in the fluid chamber with decreasing distilled water/$CaCl_2$ flow rate ratio (from bottom to top, distilled water flow rates from each water inlet=8.0, 6.4, 4.8, 12, 2.4, 1.6, and 0.8 microliters per minute respectively, and the $CaCl_2$ solution flow rate from each $CaCl_2$ solution inlet was 8.0 microliters per minute for all cases shown in FIG. 14).

FIG. 14 shows that the HS refractive index distribution within the lens chamber 29 may be conveniently adjusted by varying the fluid flow rates. FIG. 15 illustrates the relation between the change of the refractive index contrast (e.g. difference between the maximum and minimum of the refractive index profile) and the change of the fluid flow rate ratio (distilled water/$CaCl_2$ solution). Since change of the refractive index contrast corresponds to the change of the focal length, FIG. 15 shows that the focal length does not linearly increase with the flow rate ratio—it is most responsive when the flow rate ratio is low (about 0.1 to 0.5) and becomes less responsive when the flow rate ratio is close to 1.0. This observation is useful in determining the operational parameters for different embodiments of the L-GRIN lens device to optimize a particular embodiment for a particular application.

Light ray tracing simulations were also conducting using the flow rate parameters of 8.0 microliters per minute, 3.2 microliters per minute and 2.4 microliters per minute flow rates for distilled water inlets in each fluid path. A flow rate of 8.0 microliters for $CaCl_2$ solution for each $CaCl_2$ solution inlet was used for each simulation of the change in water flow rate for each fluid path. The simulation resulted in showing that the lens chamber 29 provided a collimation of light from the laser 27 that bent gradually towards the center of the lens chamber along a vertical axis (Z-axis). After exiting the L-GRIN laser chamber, the light continuously propagated through the glass slide and converged within the dye chamber where the focal point was located. Changing the fluid injection ratios, or fluid flow rates, resulted in a change of refractive index gradient causing the light to bend differently and resulting in a shift of the focal point. The simulation results showed that the focal length increased when the flow rates of distilled water were decreased. The tuning range for the focal point was found to be about 130 micrometers along the vertical axis.

Such focal point positioning may be similar to the changes shown in FIGS. 21 through 23. The change in focal point may occur along the vertical axis for the lens device 21.

A series of experiments were also conducted for the embodiment of the lens device 21. FIG. 16 illustrates light intensity plots along the vertical axis, or Z axis, that was obtained via the experimentation using three different flow rates for the 532 nanometer laser 27. Those flow rates for distilled water inlets were 8.0 microliters per minute, 3.2 microliters per minute and 2.4 microliters per minute. For all three cases, the flow rate of 8.0 microliters for $CaCl_2$ solution via the $CaCl_2$ solution inlets. It should be understood that the maximum intensity indicates the position of the focal point on the Z axis. FIG. 16 shows that a shift of focal point may be obtained in the range of about 120 micrometers, which corresponds well with the 130 micrometer result obtained from simulations.

From the experimental results, the maximum numerical aperture (NA=n*sin θ, where n is the refractive index in the dye chamber) was measured to be 0.249 with the refractive index in the dye chamber being about 1.33 and θ being half of the focused beam exit angle. NA is an important parameter to evaluate the focusing ability of lenses and a high NA is often required for optical trapping and high resolution imaging. The improvement of the NA can be achieved by increasing the depth of the L-GRIN lens chamber 29 or the refractive index contrast between the two fluids passing in the different fluid paths which may lead to a more dramatic bending of the light beams.

Figure 3A:
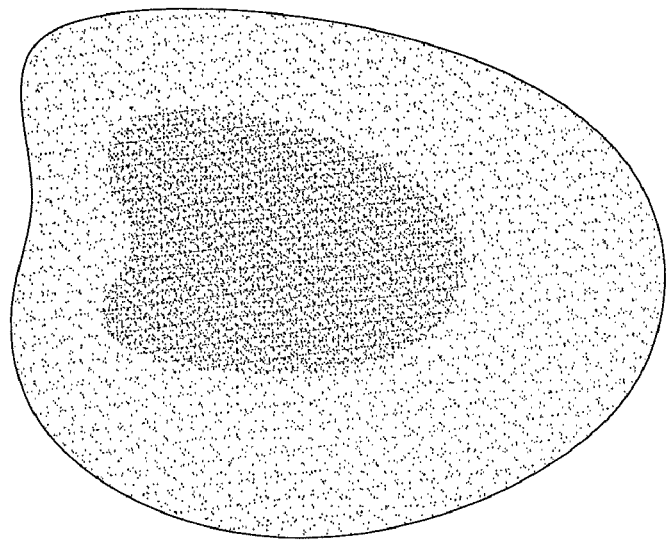
FIG. 3A is an image of an output of light that may be provided by embodiments of the optofluidic cylindrical lens.
Figure 3B:
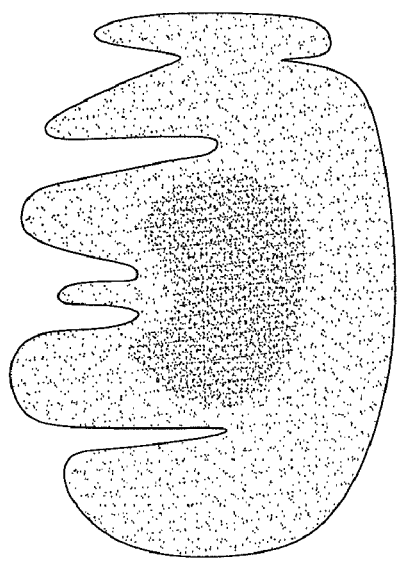
FIG. 3B is an image of an output of light that may be provided by embodiments of the optofluidic cylindrical lens.
Figure 3C:
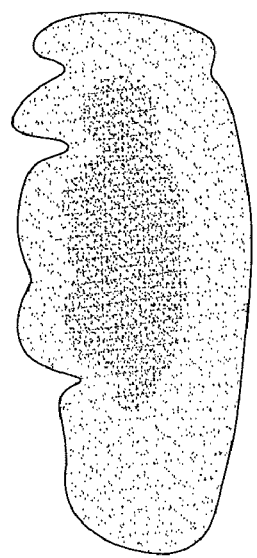
FIG. 3C is an image of an output of light that may be provided by embodiments of the optofluidic cylindrical lens.
Figure 5A:
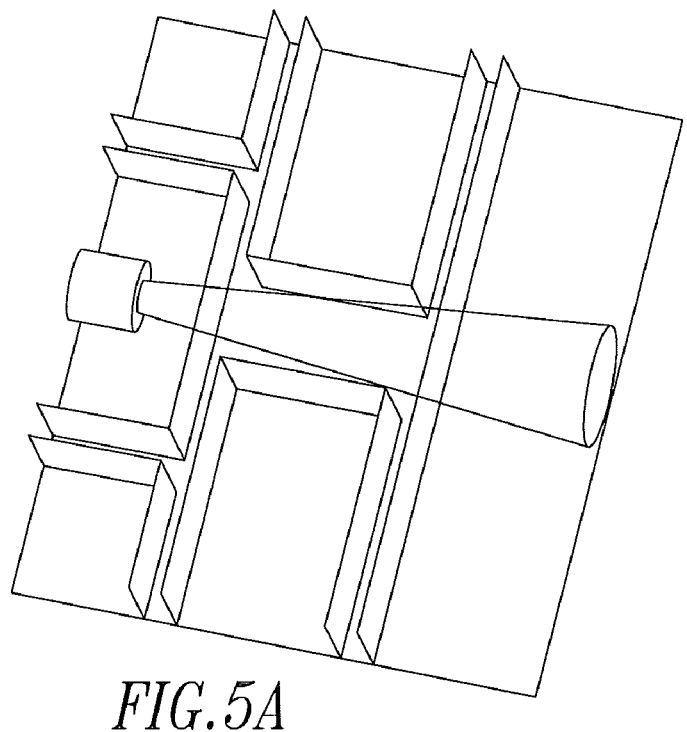
FIG. 5A is a schematic view illustrating a first type of light focusing that may be provided by adjusting flow rates in embodiments of our L-GRIN lens device.
Figure 5B:
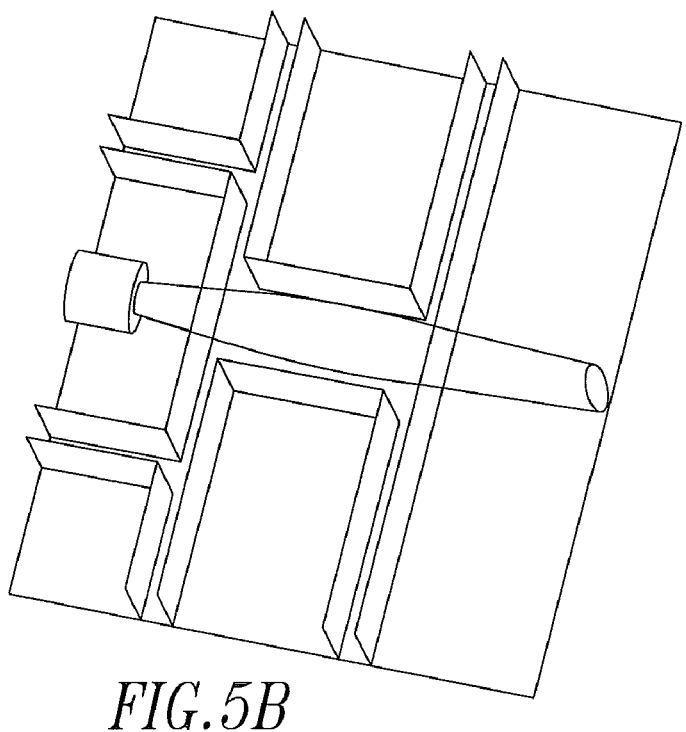
FIG. 5B is a schematic view illustrating the second type of light focusing that may be provided by adjusting flow rates in embodiments of our L-GRIN lens device.
Figure 5C:
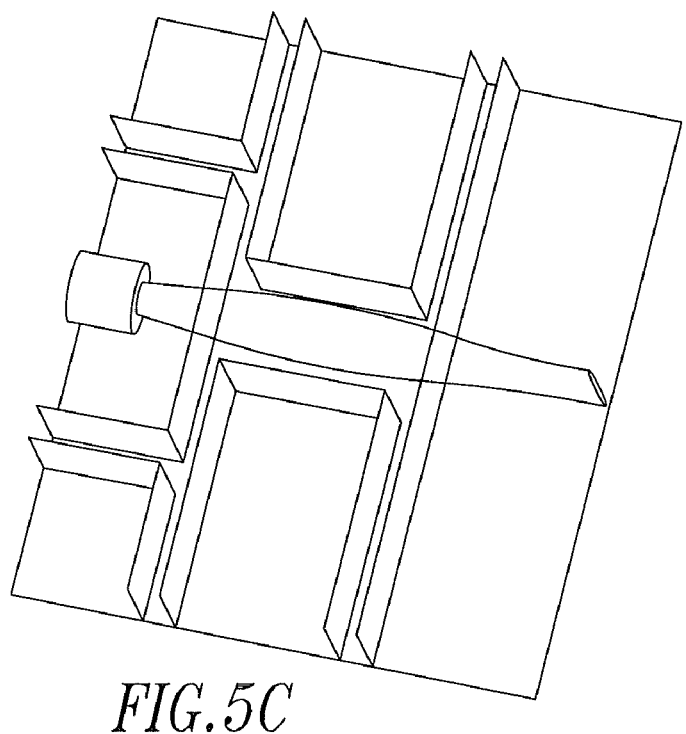
FIG. 5C is a schematic view illustrating the third type of light focusing that may be provided by adjusting flow rates in embodiments of our L-GRIN lens device.
Figure 5D:
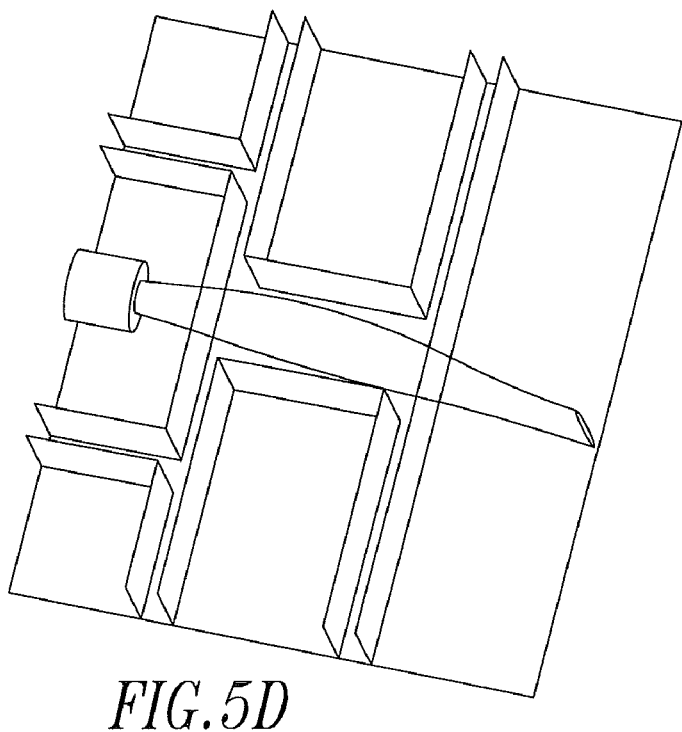
FIG. 5D is a schematic view illustrating a fourth type of light focusing and also changes the direction of the light that may be provided by adjusting flow rates in embodiments of our L-GRIN lens device.
Figure 5E:
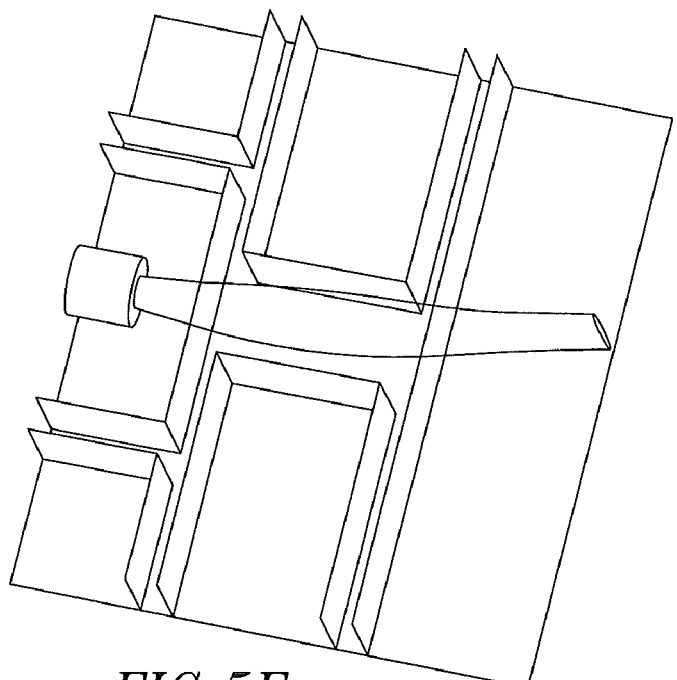
FIG. 5E is a schematic view illustrating a fifth type of light focusing that also changes the direction of the light that may be provided by adjusting flow rates in embodiments of our L-GRIN lens device.

The top view images of the focused light spots in the dye chamber (X-Y plane, or horizontal plane) at different flow conditions were also assessed utilizing the embodiment of the lens device 21. FIGS. 17-20 illustrate the changes of 2D intensity distribution of the changes of 2D intensity distribution of the light beam at different focusing conditions. FIG. 17 illustrates an unfocused light distribution in the dye chamber when the lens chamber 29 is not operational (e.g. stagnant flow in the lens chamber 29). FIGS. 18-20 illustrate light focusing patterns from under-focused (FIG. 18) to well-focused (FIG. 20) at different flow injection conditions. The distilled water flow rates via the water inlets for each fluid path are 6.4 μl/min for FIG. 18, 4.8 μl/min for FIG. 19, and 3.2 μl/min for FIG. 20 and the flow rate of the $CaCl_2$ solution is 8.0 μl/min for each $CaCl_2$ solution inlet for each fluid path for the results shown in FIGS. 18-20. The light intensity is increased by a factor of 4.5 from a non-focused condition shown in FIG. 17 to the well-focused condition shown in FIG. 20.

It should be understood that the shape of the focused light obtained from the lens device 21 may be square or rectangular in shape or may be polygonal in shape with stronger intensity distribution along two perpendicular directions, which is different from the circular light spots obtained with most existing 2D lenses. The light distribution is caused by the refractive index distribution of the lens chamber 29 and the shape of the geometry of the lens chamber 29. It should be appreciated that further improvement of the 2D refractive index distribution may also be obtained to achieve a more desirable light focusing pattern by optimizing the geometry of the lens chamber 29 for a particular industrial application or design objective.

It should also be appreciated that the L-GRIN lens device 21 may allow the flow consumption rate of fluids to be much lower than in liquid-liquid interface based microlenses. The lower consumption rate is possible due at least in part to the fact that the L-GRIN lens device 21 operates through the diffusion of $CaCl_2$ within the first and second fluid path flows and does not rely on any clearly defined, curved fluid-fluid interface. Further, the L-GRIN lens device 21 may also provide a planar microfluidic structure to provide a mechanism for providing a refractive index gradient for the light emitted by the laser 27.

Of course, embodiments of our lens device may be configured in various different ways from the exemplary embodiments disclosed herein. For instance, different fluids may be used to form the refractive index of the main channel in different lenses. It is also contemplated that other fluids may be used as fluid flows in embodiments of our lens. As another example, the size or dimensions of the fluid inlets, outlets, or light reflecting channel may be altered to meet a particular design objective. As yet another example, it is contemplated that different light sources from those explicitly disclosed herein may also be utilized in embodiments of our lens device.

It is also contemplated that embodiments of the lens device 21 may utilize different water flow rates for each water inlet of each fluid path. For instance, it is contemplated that distilled water flow rates for water inlets 35 and 45 may be 4.0 microliters per minute and the distilled water flow rates for water inlets 33 and 43 may be 3.0 microliters per minute. The $CaCl_2$ solution flow rates via each $CaCl_2$ solution inlet 37 and 47 may be 8.0 microliters per minute. Such flow rates of fluid via each fluid path may provide a different refractive index distribution within the lens chamber for adjusting the angle at which light may be reflected to adjust a position of the focal point of the light emitted from the lens device 21.

Additionally, it is also contemplated that the fluid flow rates along each fluid path of the lens device 21 may occur at different rates. For example, it is contemplated that distilled water flow rates for water inlet 35 may be 4.0 microliters per minute, the distilled water flow rate for water inlet 33 may be 3.0 microliters per minute, and the $CaCl_2$ solution flow rate via $CaCl_2$ solution inlet 37 may be 8.0 microliters per minute for defining a fluid flow rate along the first fluid path. The water inlet 45 may be 4.5 microliters per minute, the distilled water flow rate for water inlet 43 may be 3.5 microliters per minute, and the $CaCl_2$ solution flow rate via $CaCl_2$ solution inlet 47 may be 8.5 microliters per minute for defining a fluid flow rate along the second fluid path. Such flow rates of fluid via each fluid path may also provide a different refractive index distribution within the lens chamber for adjusting the angle at which light may be reflected to adjust a position of the focal point of the light emitted from the lens device 21.

While certain present preferred embodiments of our lens device and methods of making and using the same have been shown and described above, it is to be distinctly understood that the invention is not limited thereto but may be otherwise variously embodied and practiced within the scope of the following claims.

We claim:

1. A lens device comprising:
   a substrate having a channel and a first fluid path and a second fluid path, the first and second fluid paths at least partially in communication with the channel;
   a light emitting device positioned adjacent to the channel;
   at least one first fluid source in communication with the first fluid path such that a first fluid is moveable along the first fluid path;
   at least one second fluid source in communication with the second fluid path such that a second fluid is moveable along the second fluid path; and
   the first fluid path and the second fluid path configured such that the first fluid and the second fluid move through the channel to define an adjustable liquid gradient refractive index distribution in the channel, adjustment of the liquid gradient refractive index distribution permitting at least one of an angular adjustment of light emitted by the light emitting device and an adjustment of a focal distance of the light emitted by the light emitting device; and
   wherein the at least one first fluid source and the at least one second fluid source are each comprised of a solution inlet and at least one water inlet.

2. The lens device of claim 1 wherein adjustment of water flow of at least one of the at least one first fluid source and the at least one second fluid source adjusts the liquid gradient refractive index distribution.

3. The lens device of claim 1 wherein adjustment of water flow rate of only the first fluid or only the second fluid adjusts the liquid gradient refractive index distribution.

4. A lens device comprising:
a substrate having a channel and a first fluid path and a second fluid path, the first and second fluid paths at least partially in communication with the channel;
a light emitting device positioned adjacent to the channel;
at least one first fluid source in communication with the first fluid path such that a first fluid is moveable along the first fluid path;
at least one second fluid source in communication with the second fluid path such that a second fluid is moveable along the second fluid path; and
the first fluid path and the second fluid path configured such that the first fluid and the second fluid move through the channel to define an adjustable liquid gradient refractive index distribution in the channel, adjustment of the liquid gradient refractive index distribution permitting at least one of an angular adjustment of light emitted by the light emitting device and an adjustment of a focal distance of the light emitted by the light emitting device; and
a first pump, a second pump, a third pump and a fourth pump, and the first fluid moveable along the first fluid path comprised of at least one water flow and a calcium chloride solution flow and the second fluid moveable along the second fluid path comprised of at least one water flow and a calcium chloride solution flow, the first pump configured to control a flow rate of the water of the first fluid and the second pump configured to control a flow rate of calcium chloride solution of the first fluid, the third pump configured to control a flow rate of the water of the second fluid and the fourth pump configured to control a flow rate of the calcium chloride solution of the second fluid.

5. A lens device comprising:
a substrate having a channel and a first fluid path and a second fluid path, the first and second fluid paths at least partially in communication with the channel;
a light emitting device positioned adjacent to the channel;
at least one first fluid source in communication with the first fluid path such that a first fluid is moveable along the first fluid path;
at least one second fluid source in communication with the second fluid path such that a second fluid is moveable along the second fluid path; and
the first fluid path and the second fluid path configured such that the first fluid and the second fluid move through the channel to define an adjustable liquid gradient refractive index distribution in the channel, adjustment of the liquid gradient refractive index distribution permitting at least one of an angular adjustment of light emitted by the light emitting device and an adjustment of a focal distance of the light emitted by the light emitting device; and
wherein light from the light emitting device is configured to pass through the channel in a direction perpendicular to all directions the first fluid flows through the channel and all directions the second fluid flows through the channel.

6. The lens device of claim 5 wherein the adjustment of the liquid gradient refractive index distribution causes the angular adjustment of light emitted by the light emitting device and the adjustment of the focal distance of the light emitted by the light emitting device.

7. A lens device comprising:
a substrate having a channel and a first fluid path and a second fluid path, the first and second fluid paths at least partially in communication with the channel;
a light emitting device positioned adjacent to the channel;
at least one first fluid source in communication with the first fluid path such that a first fluid is moveable along the first fluid path;
at least one second fluid source in communication with the second fluid path such that a second fluid is moveable along the second fluid path; and
the first fluid path and the second fluid path configured such that the first fluid and the second fluid move through the channel to define an adjustable liquid gradient refractive index distribution in the channel, adjustment of the liquid gradient refractive index distribution permitting at least one of an angular adjustment of light emitted by the light emitting device and an adjustment of a focal distance of the light emitted by the light emitting device; and
wherein the channel is a chamber and the light emitting device is positioned below the substrate or is positioned above the substrate such that light from the light emitting device passes vertically through the chamber in a direction that is perpendicular to a direction in which the first fluid flows through the chamber.

8. The lens device of claim 7 wherein the liquid gradient refractive index distribution is adjustable by adjusting at least one of flow rate of the first fluid and flow rate of the second fluid.

9. The lens device of claim 7 wherein the lens device has an optical axis and the movement of the first fluid and the movement of the second fluid are configured such that adjustment of at least a portion of flow of the first fluid or flow of the second fluid shifts the optical axis of the lens device.

10. The lens device of claim 7 wherein the lens device is sized and configured for a lab-on-a-chip application.

11. The lens device of claim 7 wherein the substrate is the substrate of a microchip or nanochip.

12. The lens device of claim 7 further comprising at least one pump attached to the first fluid flow path or the second fluid flow path, the at least one pump configured to control flow of the first fluid or flow of the second fluid.

13. The lens device of claim 7 further comprising at least one first pump and at least one second pump, each first pump attached to the first fluid path to control flow of the first fluid and each second pump attached to the second fluid path to control flow of the second fluid.

14. The lens device of claim 7 wherein the angular adjustment of light emitted by the light emitting device is configured such that light is reflectable such that the reflected light is off an optical axis of the light emitted by the light emitting device.

15. The lens device of claim 7 wherein the lens device reflects an output light that has an optical axis that is off an optical axis of light emitted by the light emitting device.

16. The lens device of claim 7 wherein the light emitting device is a light emitting diode, a fiber optic mechanism, or a laser and wherein the channel, first fluid path and second fluid path are at least partially defined in the substrate.

17. The lens device of claim 7 wherein the adjustment of the liquid gradient refractive index distribution causes the angular adjustment of light emitted by the light emitting device and the adjustment of the focal distance of the light emitted by the light emitting device.

18. A lens device comprising:
a substrate having a channel and a first fluid flow path and a second fluid flow path, the first and second fluid flow paths at least partially in communication with the channel;
at least one first fluid source in communication with the first fluid flow path such that a first fluid is moveable along the first fluid flow path;
at least one second fluid source in communication with the second fluid flow path such that a second fluid is moveable along the second fluid flow path; and
the first fluid flow path and the second fluid flow path configured such that the first fluid and the second fluid move through the channel to define an adjustable liquid gradient refractive index distribution in the channel, adjustment of the liquid gradient refractive index distribution permitting an angular adjustment of light that passes through the channel; and
wherein the at least one first fluid source is comprised of a first inlet, a second inlet and a third inlet, the third inlet being positioned between the first and second inlets, the third inlet configured to feed a material that is different than material fed via the first inlet and is also different than material fed via the second inlet; and
wherein the at least one second fluid source is comprised of a first inlet, a second inlet and a third inlet, the third inlet of the at least one second fluid source being positioned between the first and second inlets, the third inlet of the at least one second fluid source configured to feed a material that is different than material fed via the first inlet of the at least one second fluid source and is also different than material fed via the second inlet of the at least one second fluid source.

19. The lens device of claim 18 wherein material fed via the third inlet of the at least one first fluid source is fed at a flow rate that is different than a flow rate of material fed via the first inlet of the at least one first fluid source and is also different than a flow rate of material fed via the second inlet of the at least one first fluid source; and
wherein material fed via the third inlet of the at least one second fluid source is fed at a flow rate that is different than a flow rate of material fed via the first inlet of the at least one second fluid source and is also different than a flow rate of material fed via the second inlet of the at least one second fluid source.

20. The lens device of claim 19 wherein the material fed via the first inlet of the at least one first fluid source is fed at a flow rate that is equal to or greater than the flow rate of material fed via the second inlet of the at least one first fluid source, and the flow rate of material fed via the first inlet of the at least one second fluid source is greater than or equal to the flow rate of material fed via the second inlet of the at least one second fluid source.

21. The lens device of claim 19 wherein the material fed via the first inlet of the first fluid source is water, the material fed via the second inlet of the first fluid source is water and the material fed via the third inlet of the first fluid source is a solution and wherein the material fed via the first inlet of the second fluid source is water, the material fed via the second inlet of the second fluid source is water and the material fed via the third inlet of the second fluid source is a solution.

22. The lens device of claim 21 wherein the channel is aligned such that the channel is generally straight and does not have any portion that is curved.

23. The lens device of claim 18 wherein the adjustment of the liquid gradient refractive index distribution causes the angular adjustment of light emitted by the light emitting device and the adjustment of the focal distance of the light emitted by the light emitting device.

* * * * *

UNITED STATES PATENT AND TRADEMARK OFFICE
CERTIFICATE OF CORRECTION

| | | |
|---|---|---|
| PATENT NO. | : 8,320,049 B2 | Page 1 of 1 |
| APPLICATION NO. | : 12/836651 | |
| DATED | : November 27, 2012 | |
| INVENTOR(S) | : Tony Jun Huang and Xiaole Mao | |

It is certified that error appears in the above-identified patent and that said Letters Patent is hereby corrected as shown below:

Col. 1, at line 15 under the heading STATEMENT REGARDING FEDERALLY SPONSORED RESEARCH, delete the entire paragraph (lines 18-26) and insert the following:

--This invention was made with government support under Grant Nos. ECCS0824183, ECCS0801922 and ECCS0609128, awarded by the National Science Foundation. The Government has certain rights in the invention.--

Signed and Sealed this
Twelfth Day of February, 2013

Teresa Stanek Rea
*Acting Director of the United States Patent and Trademark Office*